US008571953B2

(12) United States Patent
Gopalakrishnan et al.

(10) Patent No.: US 8,571,953 B2
(45) Date of Patent: Oct. 29, 2013

(54) SYSTEM AND METHOD FOR PROCESSING TRAVEL EXPENSE VOUCHERS

(75) Inventors: Nitya Gopalakrishnan, Heritage City (IN); Sharat Kumar, Delhi (IN); Periaswamy Ramalingam, New Delhi (IN)

(73) Assignee: American Express Travel Related Services Company, Inc., New York, NY (US)

(*) Notice: Subject to any disclaimer, the term of this patent is extended or adjusted under 35 U.S.C. 154(b) by 589 days.

(21) Appl. No.: 12/107,474

(22) Filed: Apr. 22, 2008

(65) Prior Publication Data

US 2009/0265232 A1  Oct. 22, 2009

(51) Int. Cl.
*G06Q 40/00* (2012.01)

(52) U.S. Cl.
USPC .................................................. 705/35

(58) Field of Classification Search
USPC ............................................ 705/35–45
See application file for complete search history.

(56) References Cited

U.S. PATENT DOCUMENTS

| | | | | | |
|---|---|---|---|---|---|
| 5,899,981 | A | * | 5/1999 | Taylor et al. | 705/30 |
| 6,009,408 | A | * | 12/1999 | Buchanan | 705/5 |
| 6,029,144 | A | * | 2/2000 | Barrett et al. | 705/30 |
| 7,395,231 | B2 | * | 7/2008 | Steury et al. | 705/34 |
| 7,672,881 | B2 | * | 3/2010 | Steury et al. | 705/34 |
| 7,693,794 | B2 | * | 4/2010 | Wind et al. | 705/44 |
| 7,720,702 | B2 | * | 5/2010 | Fredericks et al. | 705/6 |
| 7,953,664 | B2 | * | 5/2011 | Jung et al. | 705/44 |
| 7,974,892 | B2 | * | 7/2011 | Fredericks et al. | 705/30 |
| 8,195,538 | B2 | * | 6/2012 | Steury et al. | 705/34 |
| 2003/0040987 | A1 | * | 2/2003 | Hudson et al. | 705/30 |
| 2004/0002876 | A1 | * | 1/2004 | Sommers et al. | 705/6 |
| 2004/0167808 | A1 | * | 8/2004 | Fredericks et al. | 705/5 |
| 2007/0016526 | A1 | * | 1/2007 | Hansen et al. | 705/40 |
| 2009/0099965 | A1 | * | 4/2009 | Grant, IV | 705/41 |

OTHER PUBLICATIONS

Rosato, Donney, "My Corporate Card Incurred Late Fees!", Money, Jun 2007, vol. 36, issue 6, pg. 26-26.*
Robert Carroll. (Mar. 4, 1999). District tightens accounting policies Raymore-Peculiar responds to abuses found during audit :[Metropolitan Edition]. Kansas City Star,p. 1. Retrieved Aug. 24, 2011, from ProQuest Newsstand. (Document ID: 39454686).*
Bannan, Karen J., "Breakaway (A Special Report)—Easing Expenses: Software programs cut the cost and labor of travel and entertainment reports", Wall Street Journal. (Eastern Edition), New York, N.Y.: Mar. 19, 2001, p. 14.*
Rosato, Donney, "My Corporate Card Incurred Late Fees!", Money, Jun 2007, vol. 36, issue 6, p. 26.*
Baker, Michael B., "Selecting a Corporate Payment System", Business Travel News 25.5 (Apr. 14, 2008): pp. 76-82.*
Bethmara, Kessler, "Fashioning a Fraud", Journal of Accountancy. New York: Oct. 2007, vol. 204, iss. 4, p. 60, 4 pgs.*
Anonymous, "IRS OKs Simplified Computer-Based T&E Substantian Program", Controller's Tax Letter, v12, n6, Jun. 2004, pp. 11-12.*

* cited by examiner

*Primary Examiner* — Mohammad Z Shaikh
(74) *Attorney, Agent, or Firm* — Snell & Wilmer L.L.P.

(57) ABSTRACT

This invention relates to reimbursement of travel expenses. In a first embodiment of the present invention, a computer-implemented method processes a travel expense voucher. The method determines whether the travel expense voucher satisfies a condition. If the travel expense voucher satisfies the condition, the method allows a payment corresponding to the travel expense voucher. If the travel expense voucher does not satisfy the condition, the method provides an interface to perform an audit of the travel expense voucher.

20 Claims, 28 Drawing Sheets

JAPA TEV TRACKER 2007

File Edit View Insert Format Records Tools Window Help

Audit observation during the Month

Market: AUSTRALIA Month of Audit: July Year: 2007 Actual Audited TEVs: [ ]

Observation:
1. Itineraries for claims of air fare and accomodation expense claims not submitted with the TEV.
2. Hotel rates were found to be in excess of policy limits in some cases.
3. The details on claims of entertainment expenses were observed to be incomplete in most cases.
4. Card accounts are not reconciled for most employees.
5. Stationery claims found on TEVs for purchases made thru Corporate card.

Conclusion: Airline class of service resulted in the largest dollar findings while car service represented the most transactions. Missing and minimal documentation was a hindrance in compiling some of the data; in audits the employee is generally interviewed to provide clarity on the specific item in question. Without this additional information it was not possible to come to a conclusion on many of the expense transactions. Some expenses may be business justified, however the level of support provided was not always sufficient to draw conclusion.

02-Feb-07  [Submit] [Cancel] [Add Record]   # of TEVs Audited: 26

Record 2 of 78

FIG.24

SYSTEM AND METHOD FOR PROCESSING TRAVEL EXPENSE VOUCHERS

BACKGROUND OF THE INVENTION

1. Field of the Invention

This invention relates to reimbursement of travel expenses.

2. Background Art

During business travel, customers may incur reimbursable expenses. To seek reimbursement, the customer may have to submit a travel expense voucher (TEV) to a processing center. The processing center determines whether the TEV is in compliance with a policy. If the TEV is in compliance with the policy, reimbursement is approved. Otherwise, reimbursement is denied. If reimbursement is approved, payment is made to the customer. If the customer charged the travel expense to a corporate card, the payment may be credited to the card.

Processing a TEV can be a labor and paperwork intensive process. To manage TEV processing, a spreadsheet has been used to track incoming TEVs. However, using a spreadsheet has limitations. For example, an operator has to verify manually that each TEV is in compliance with the policy. Also, the spreadsheet does not keep the customer informed of progress in processing their TEV.

What is needed are improved systems and methods to process TEVs.

BRIEF SUMMARY

This invention relates to reimbursement of travel expenses. In a first embodiment of the present invention, a method processes a travel expense voucher. The method determines whether the travel expense voucher satisfies a condition. If the travel expense voucher satisfies the condition, the method allows a payment corresponding to the travel expense voucher. If the travel expense voucher does not satisfy the condition, the method provides an interface to perform an audit of the travel expense voucher.

In a second embodiment of the present invention, a system processes a travel expense voucher. The system includes a pre-audit validation module that determines whether the travel expense voucher satisfies a condition and allows a payment corresponding to the travel expense voucher if the travel expense voucher satisfies the condition. The system also includes an audit module that provides an interface to perform an audit of the travel expense voucher if the travel expense voucher does not satisfy the condition.

In a third embodiment of the present invention, a computer program product includes a tangible computer useable medium having computer control logic stored therein for processing a travel expense voucher. The computer control logic includes computer readable program code for: determining whether the travel expense voucher satisfies a condition; allowing a payment corresponding to the travel expense voucher if the travel expense voucher satisfies the condition; and providing an interface to perform an audit of the travel expense voucher if the travel expense voucher does not satisfy the condition.

In this way, embodiments of the present invention help ensure compliance and improve customer service when processing TEVs.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 4-28 are screenshots of a user interface for processing TEVs, which may be used by a user interface of the system in FIG. 1.

FIG. 29 is a block diagram of an exemplary computer system useful for implementing the present invention.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Figure 1:
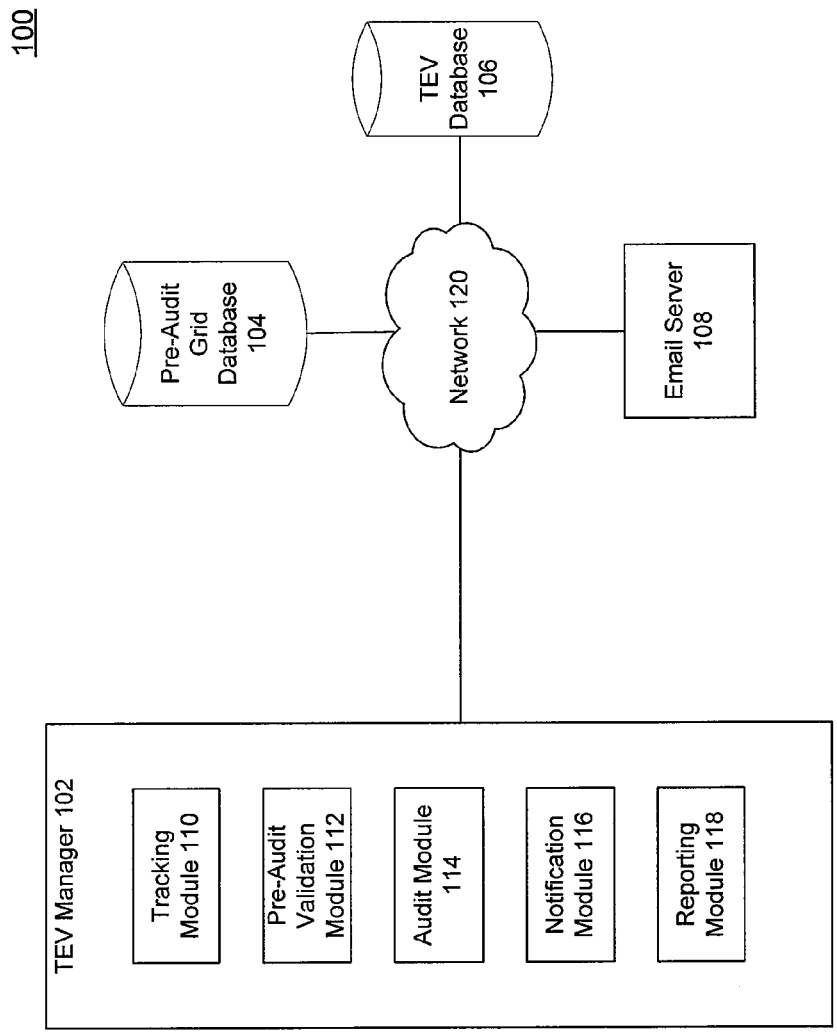
FIG. 1 is an architecture diagram illustrating a system for processing TEVs according to an embodiment of the present invention.

The present invention relates to reimbursement of travel expenses using travel expense vouchers. In an embodiment, a system determines whether the travel expense vouchers satisfy a condition in a pre-audit grid. In examples, the system may also ensure compliance with an audit and notify the customer of updates related to the TEV. In this way, embodiments of the present invention help ensure compliance and improve customer service.

In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

This Detailed Description is divided into sections. The first section provides an overview of accounts and cards as they relate to the present invention. The second section describes systems and methods for processing TEVs according to embodiments of the present invention with respect to the figures.

I. Overview Of Accounts And Cards

A TEV may be associated with a transactional account or card, as described below. The expenses listed on a TEV may be incurred using a transactional card and debited to a transactional account. If reimbursement of the TEV is authorized, the payment may be credited to the transactional account.

1. Transaction Accounts and Instruments

A "transaction account" as used herein refers to an account associated with an open account or a closed account system, as described below. The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument.

A financial transaction instrument may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader.

2. Open Versus Closed Cards

"Open cards" are financial transaction cards that are generally accepted at different merchants. Examples of open cards include the American Express®, Visa®, MasterCard® and Discover® cards, which may be used at many different retailers and other businesses. In contrast, "closed cards" are financial transaction cards that may be restricted to use in a particular store, a particular chain of stores or a collection of affiliated stores. One example of a closed card is a pre-paid gift card that may only be purchased at, and only be accepted at, a clothing retailer, such as The Gap® store.

3. Stored Value Cards

Stored value cards are forms of transaction instruments associated with transaction accounts, wherein the stored value cards provide cash equivalent value that may be used within an existing payment/transaction infrastructure. Stored value cards are frequently referred to as gift, pre-paid or cash cards, in that money is deposited in the account associated with the card before use of the card is allowed. For example, if a customer deposits ten dollars of value into the account associated with the stored value card, the card may only be used for payments together totaling no more than ten dollars.

4. Use of Transaction Accounts

With regard to use of a transaction account, users may communicate with merchants in person (e.g., at a restaurant), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit implemented in the form of a computer-server, although other implementations are possible.

In general, transaction accounts may be used for transactions between the user and merchant through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

5. Account and Merchant Numbers

An "account," "account number" or "account code", as used herein, may include any device, code, number, letter, symbol, digital certificate, smart chip, digital signal, analog signal, biometric or other identifier/indicia suitably configured to allow a consumer to access, interact with or communicate with a financial transaction system. The account number may optionally be located on or associated with any financial transaction instrument (e.g., rewards, charge, credit, debit, prepaid, telephone, embossed, smart, magnetic stripe, bar code, transponder or radio frequency card).

The account number may be distributed and stored in any form of plastic, electronic, magnetic, radio frequency (RF), wireless, audio and/or optical device capable of transmitting or downloading data from itself to a second device. A customer account number may be, for example, a sixteen-digit credit card number. Each credit card issuer has its own numbering system, such as the fifteen-digit numbering system used by American Express Company of New York, N.Y. Each issuer's credit card numbers comply with that company's standardized format such that an issuer using a sixteen-digit format will generally use four spaced sets of numbers in the form of:

$N_1N_2N_3N_4\ N_5N_6N_7N_8\ N_9N_{10}N_{11}N_{12}\ N_{13}N_{14}N_{15}N_{16}$

The first five to seven digits are reserved for processing purposes and identify the issuing institution, card type, etc. In this example, the last (sixteenth) digit is typically used as a checksum for the first 15 digits. The intermediary eight-to-ten digits are used to uniquely identify the customer, card holder or cardmember.

A merchant account number may be, for example, any number or alpha-numeric characters that identifies a particular merchant for purposes of card acceptance, account reconciliation, reporting and the like.

Persons skilled in the relevant arts will understand the breadth of the terms used herein and that the exemplary descriptions provided are not intended to be limiting of the generally understood meanings attributed to the foregoing terms.

II. Systems And Methods For Processing Tevs

FIG. 1 is an architecture diagram of a system 100 for processing travel expense vouchers (TEVs), according to an embodiment of the present invention. System 100 tracks and audits TEVs, creates reports related to TEV processing and notifies customers of updates to their TEVs.

System 100 includes a TEV manager 102. TEV manager 102 may be, for example, a client developed on a Microsoft Access™ platform. TEV manager 102 communicates with other components over one or more networks 120. The other components include a pre-audit grid database 104, a TEV database 106, and an email server 108.

TEV manager 102 includes a tracking module 110, a pre-audit validation module 112, an audit module 114, a notification module 116, and a reporting module 118. Tracking module 110 tracks incoming TEVs. In an example, TEVs may arrive in a package received by courier. Tracking module 110 may enable a user to record the incoming package and each TEV within the package. Further, tracking module 110 may enable a user to edit particular TEV entries in TEV database 106. In other examples, tracking module 110 may enable a user to record TEVs received by fax, email, or other means.

After an incoming TEV has been recorded by tracking module 110, pre-audit validation module 112 imposes certain pre-audit validation conditions on the TEV to determine whether an audit is required. Pre-audit validation module 112 may look to pre-audit grid database 104 to determine the conditions required for a particular TEV. Such conditions can vary from location to location. In an example, where a particular expense, such as a hotel rate, airline fare or car rental, exceeds a threshold, the TEV may go through a mandatory audit. Further, a condition may exist that randomly mandates audits on a certain percentage of TEVs.

In another example, a pre-audit condition may look for an attempt to claim a late payment fee (LPF). An LPF is generally not claimable in a TEV. To look for the LPF pre-audit validation module 112 may determine if the customer had been charged an LPF in a preceding month. Data indicating whether an LPF has been charged may be stored in pre-audit grid database 104. Pre-audit grid database 104 may be integrated into other account databases. In an embodiment, LPF data in pre-audit grid database 104 may be synchronized every month.

When an audit is required by pre-audit validation module 112, audit module 114 assists in conducting an audit. The audit determines whether the TEV is allowed by policy. Audit module 114 may perform some or all portions of the audit automatically. Audit module 114 may enable a user to perform other portions of the audit. The user may look through receipts and/or or contact vendors. Audit module 114 may enable a user to input the results of the inquiry. Audit module 114 may store the results of the inquiry in TEV database 106. If the audit is satisfied or if the audit is not required, then TEV manager 102 may allow payment according to the amount claimed in the TEV. Allowing payment may include crediting a transactional card to which the expenses were charged.

Throughout the tracking and auditing process, the customer may be notified of updates by a notification module 116. Notification module 116 notifies the user when the TEV is received. Notification module 116 may also notify the user when a payment is allowed or denied according to the audit conducted by audit module 114. Notification module 116 may also send periodic updates to the user to give the user a status report on the TEV. Notification module 116 may use any of several methods to notify a claimant. In an example, notification module 116 may use email server 108 to notify the claimant by email. In another example, notification module 116 may notify the user by text message, instant message, voicemail or other means known to those in the art.

Throughout the tracking and auditing process, managers may want to recall reports relating to TEV processing. Reports may be generated by reporting module 118. Reporting module 118 conducts queries on TEV database 106 to recall data and display it in a useful format as will be described in more detail below. In examples, the reports may display how many TEVs are on the system or how many TEVs have been allowed or denied. Reporting module 118 may be implemented, for example, in Crystal Reports® reporting software. In other examples, reporting module 118 may be implemented in Microsoft Access™ database software or Microsoft Excel™ spreadsheet software.

TEV manager 102 may be implemented on any client device capable of communicating with a database. Each of those system components may include any computing device that can communicate over a network. Example computing devices, include, but are not limited to, a computer, workstation, distributed computing system, embedded system, stand-alone electronic device, networked device, mobile device, rack server, television, set-top box, or other type of computer system.

Pre-audit grid database 104 and TEV database 106 may be implemented on a relational database management system. Examples of relational databases include Oracle®, Microsoft Access®t, Microsoft SQL Server®, and MySQL database software. These examples are illustrative and are not intended to limit this invention.

Email server 108 may be implemented, for example, as an SMTP (simple mail transfer protocol) server. In another example, email server 108 may be Lotus Notes™, Microsoft Exchange™ or other messaging servers known to those in the art.

Networks 120 may be one or more networks, such as the Internet. Network 120 can be any network or combination of networks that can carry data communication, and may be referred to herein as a computer network. Such network 120 can include, but is not limited to, a local area network, medium area network, and/or wide area network such as the Internet. Network 120 can support protocols and technology including, but not limited to, World Wide Web protocols and/or services. Intermediate web servers, gateways, or other servers may be provided between components of system 100 depending upon a particular application or environment.

Figure 2:
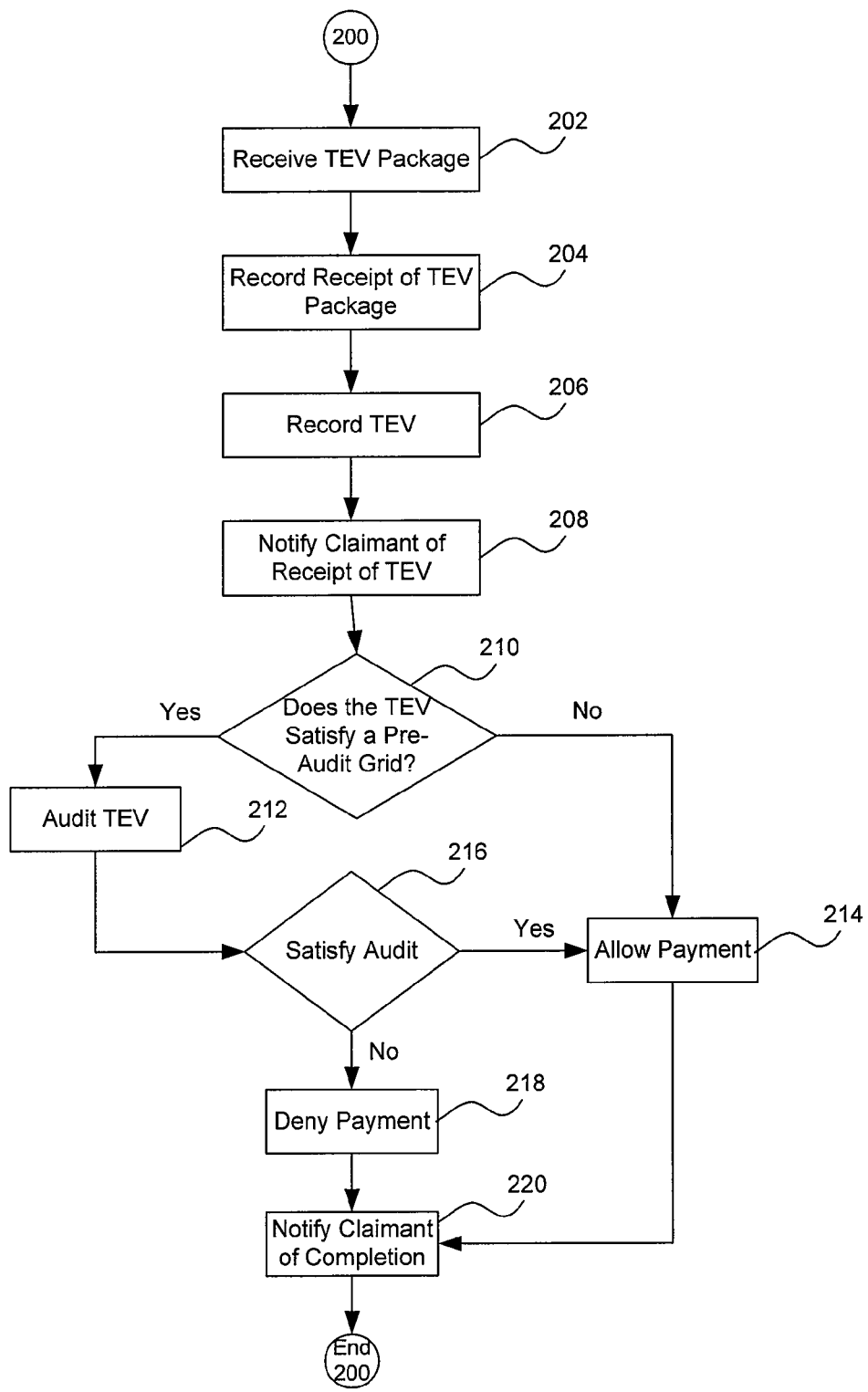
FIG. 2 is a flowchart illustrating a method for processing TEVs according to an embodiment of the present invention.

FIG. 2 shows a flowchart illustrating a method 200 for processing TEVs according to an embodiment of the present invention. Method 200 starts with a step 202. In step 202, a TEV package is received. The TEV package may be, for example, sent by courier, express mail, email, fax, or other means. In a step 204, the receipt of the TEV package is recorded. At step 206 each TEV in the TEV package is recorded. In step 208, a customer associated with each TEV is notified of the receipt of the TEV. The customer may be notified by, for example, email, SMS message, voicemail or other means. In a decision block 210, each TEV is analyzed to see if a condition is satisfied in a pre-audit grid. If the condition is satisfied, then the TEV is audited in step 212. If the audit is satisfied at decision block 216, then payment is allowed at step 214. If the condition is not satisfied, then payment is denied at step 218. Either way the claimant is notified of completion of TEV processing at step 220. Step 220 ends method 200.

Figure 3:
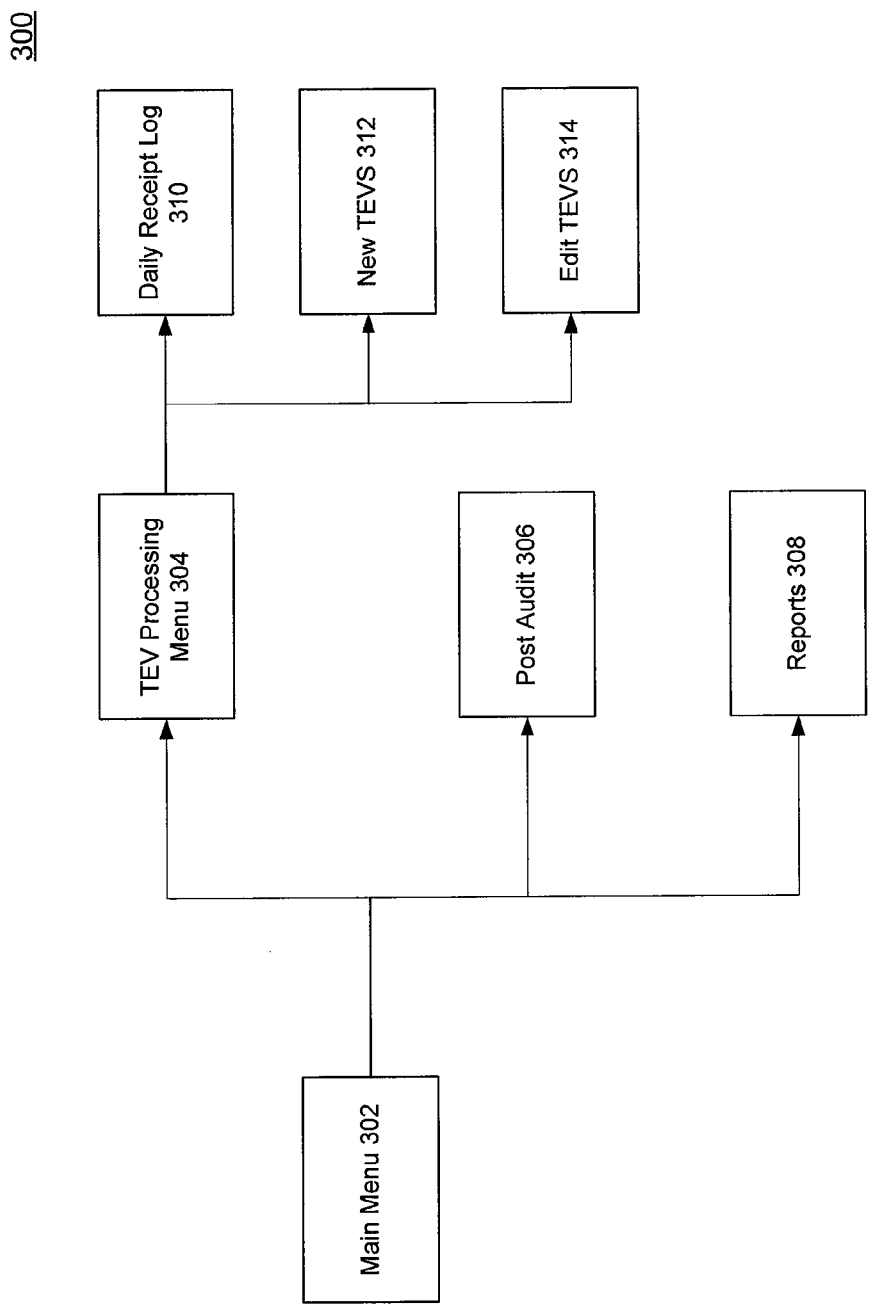
FIG. 3 is a diagram showing a sequence of screenshots, which may be used by a user interface of the system in FIG. 1.

FIG. 3 shows a diagram 300 illustrating an exemplary sequence of user interface screens, which may be used by a user interface of system 100 in FIG. 1. In an example, the user interface described in diagram 300 may be used by TEV manager 102 in FIG. 1 to carry out process 200 of FIG. 2. Each user interface screen may display data to the user. Further, each screen may include a form or menu that enables a user to enter data.

Figure 4:
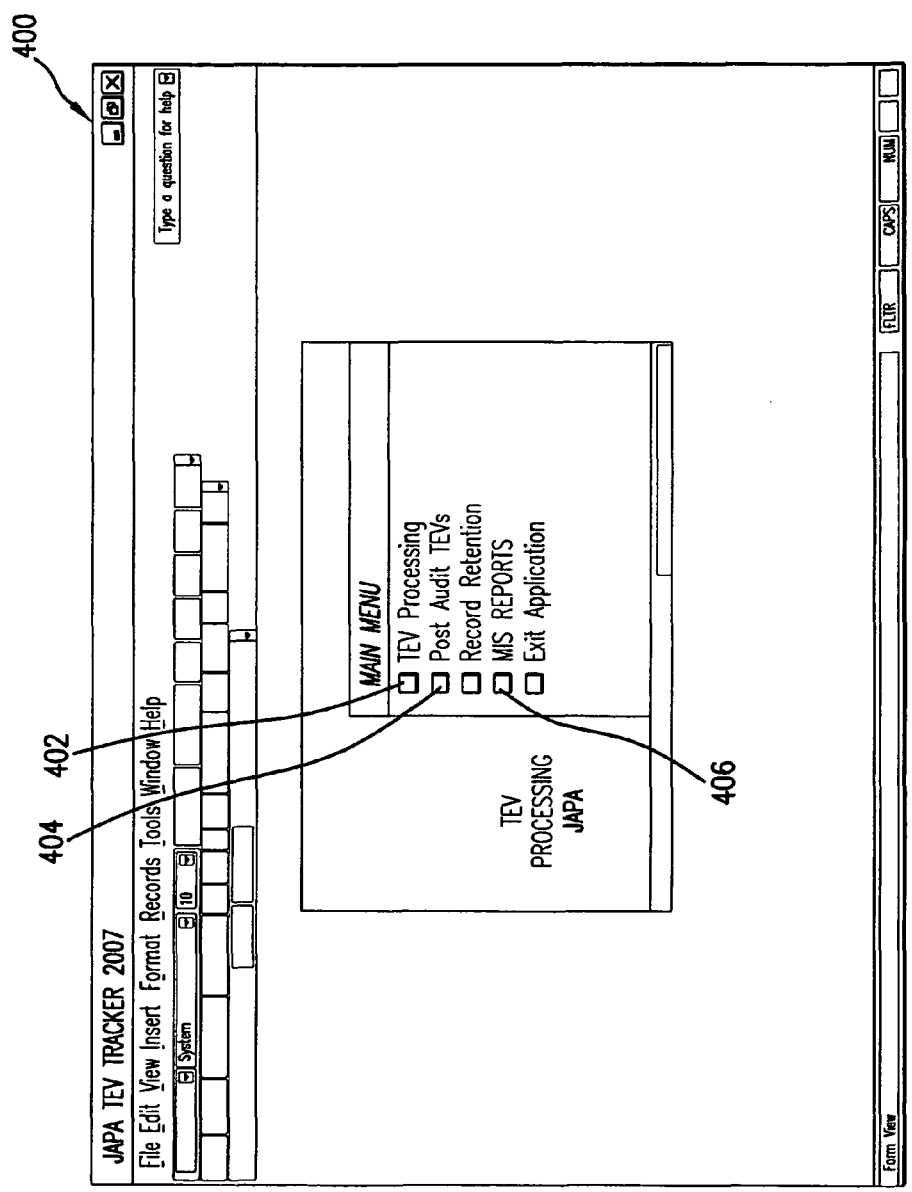

The user interface described by diagram 300 first displays a main menu 302. An example screenshot of main menu 302 is shown by a screenshot 400 in FIG. 4. Screenshot 400 contains a TEV processing button 402, a post-audit TEVs button 404 and a MIS reports button 406. As used herein, the term "button" refers to any kind of button, link, selector, or other type of user interface control element for directing a user to a different user interface screen. If the user selects TEV processing button 402, the user transitions to a TEV processing menu 304 as shown in diagram 300 in FIG. 3.

Figure 5:
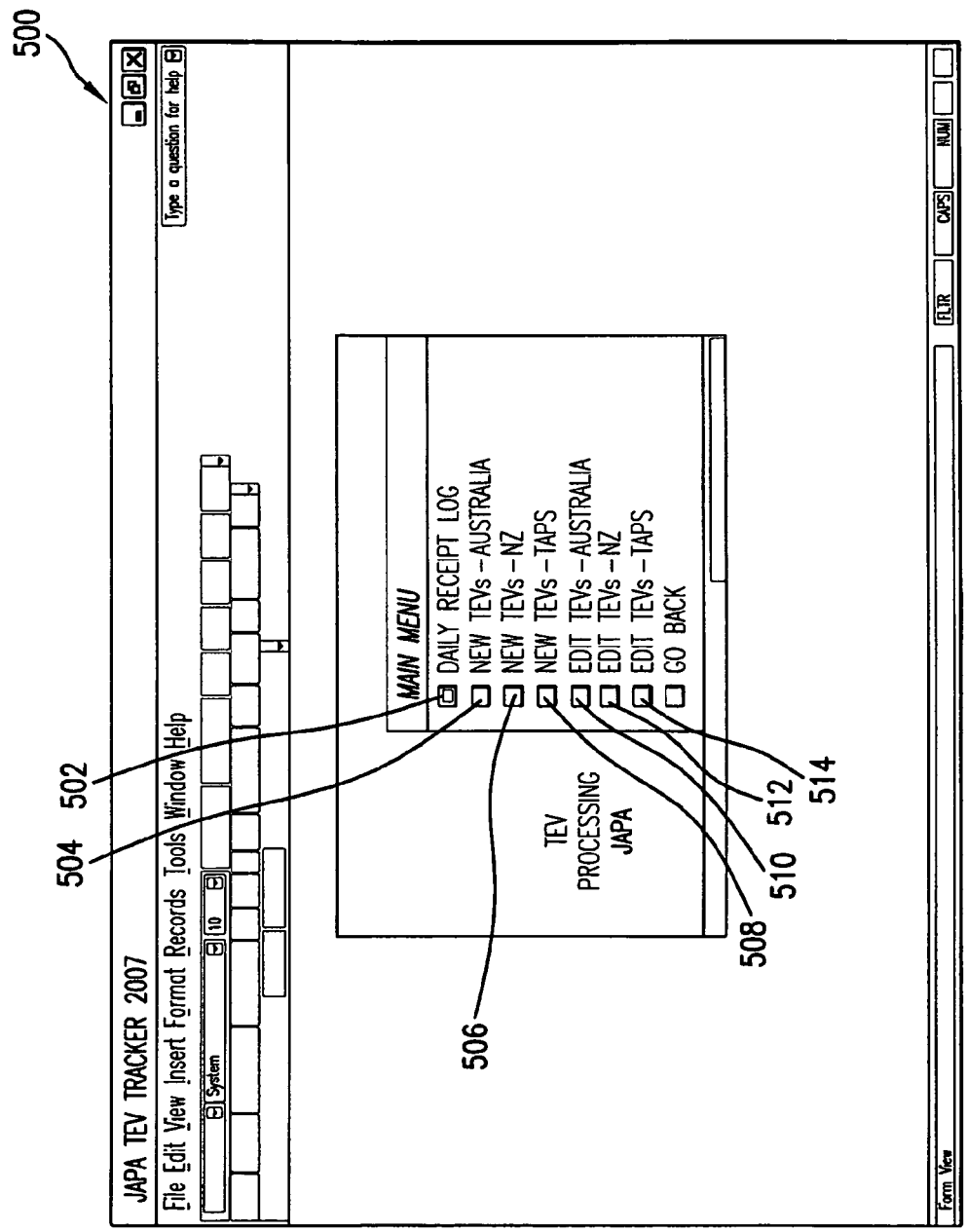

An example of TEV processing menu 304 is shown by screenshot 500 in FIG. 5. Screenshot 500 includes buttons 502, 504, 506, 508, 510, 512, and 514. Each button 502, 504, 506, 508, 510, 512, and 514 directs a user to a different screen. Button 502 directs a user to a daily receipt log 310 in FIG. 3. Buttons 504, 506 and 508 direct a user to one or more new TEV menus 312 and edit TEV buttons 510, 512 and 514 direct the user to one or more edit TEV menus 314.

Figure 6:
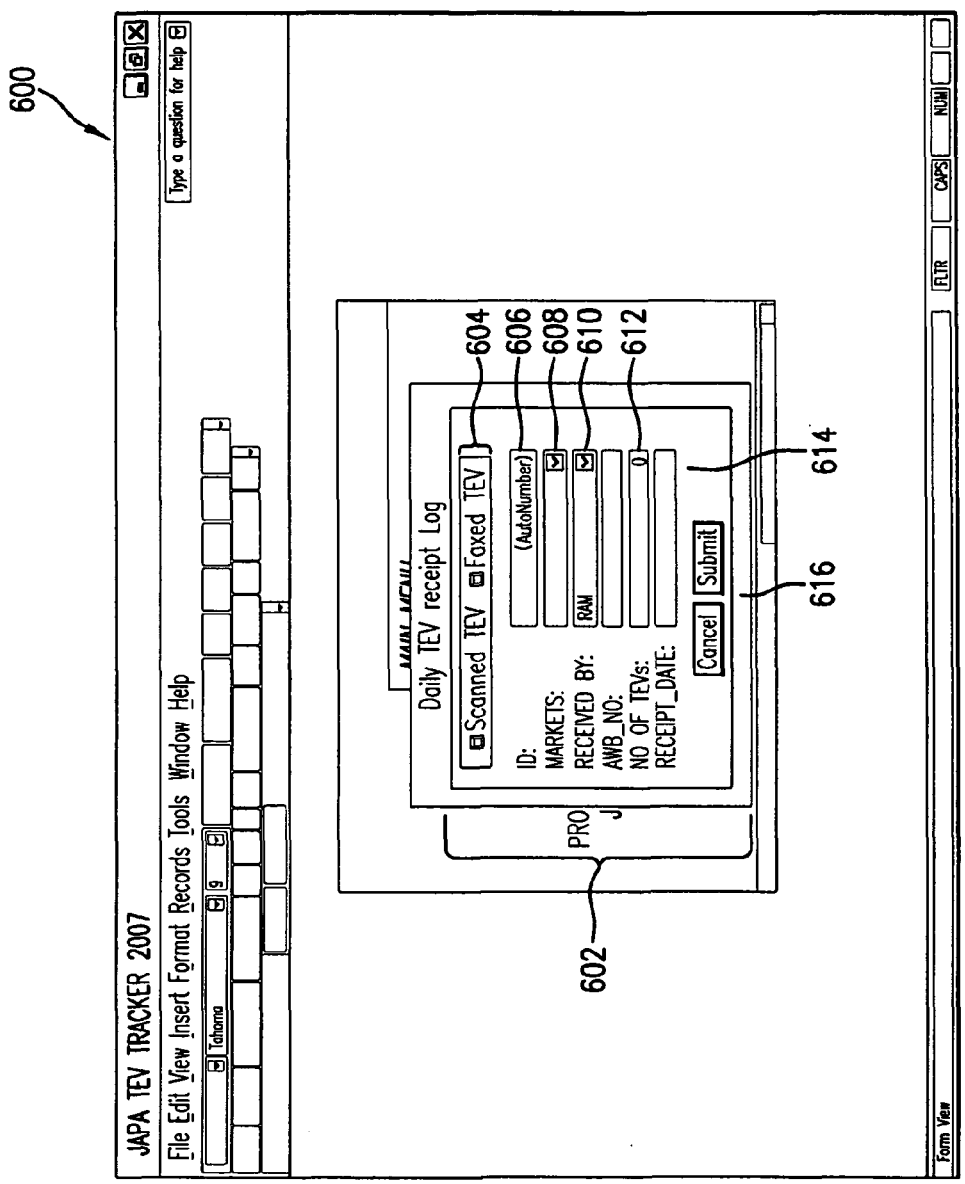
Figure 7:
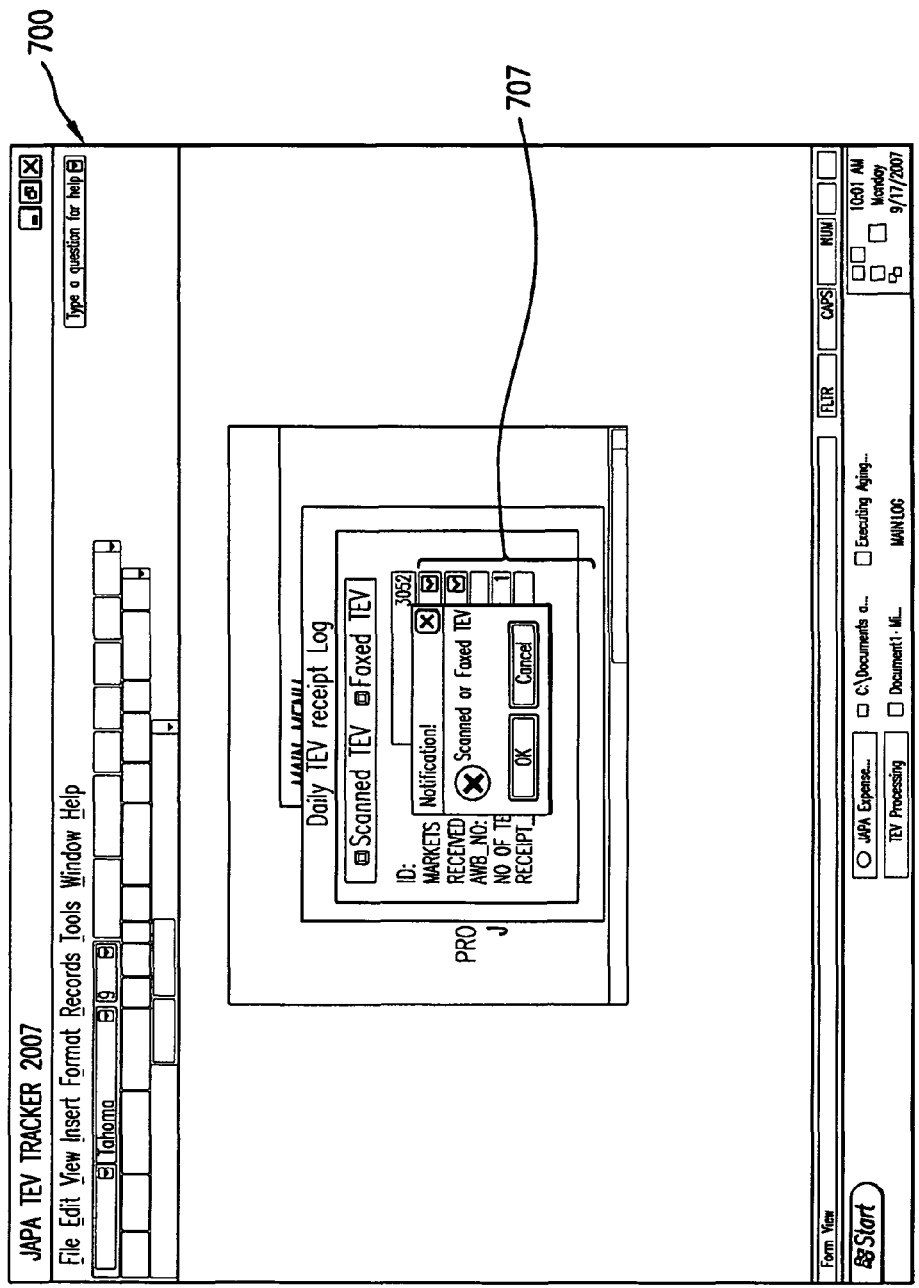
Figure 8:
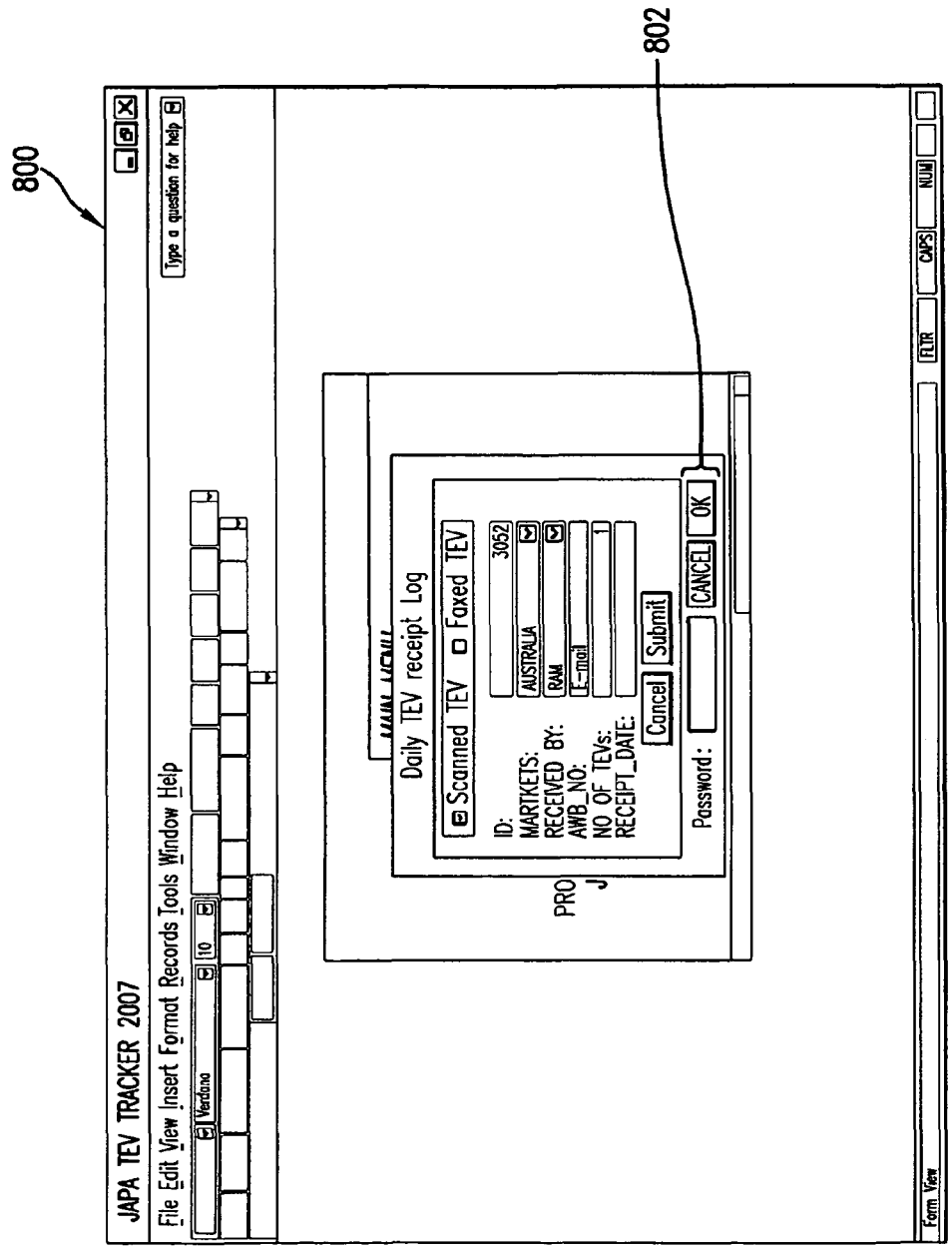

FIGS. 6-8 show example screenshots of daily receipt log 310 according to embodiments of this invention. As an example, daily receipt log 310 may be displayed by tracking module 110 in FIG. 1.

FIG. 6 shows a screenshot 600. Screenshot 600 includes an exemplary form 602. Form 602 is used to enter data about a new TEV package. The package may be received, for example, by courier, fax, or email. The package may contain multiple TEVs.

Form 602 includes checkboxes 604, a field ID text field 606, a markets dropdown menu 608, a received-by dropdown menu 610, a number-of-TEVs text field 612 and a receipt date field 614.

Checkboxes 604 may be selected if the TEV package is not received by mail or courier. For example, if TEV is received through an email, a user may select the "scanned TEV" checkbox. If the TEV package is faxed, then the user may select the "faxed TEV" checkbox.

The field ID text box 606 may be automatically completed when user selects a particular market from dropdown menu 608. Received-by text box 610 may be automatically completed with the user name of the present user using TEV manager 102. Number of TEVs text field 612 is completed by the user according to the number of TEVs received. Receipt date text field 614 may be automatically completed with the present date.

Once form 602 is completed, a user may submit the data by selecting submit button 616. Upon submitting form 602, a unique ID is generated which is later used for logging each individual TEV present in the package. This logging avoids repetitive entry of the same data relating to the packet for each TEV in a packet. Also, this logging ensures data consistency between the various TEVs in the same package.

When a user selects submit button 616, form 602 may be validated. FIG. 7 shows an example screenshot 700 where validation has failed. In an embodiment, in order to submit a scanned TEV or a faxed TEV, a password of a team leader or some other manager may be required. Screenshot 700 shows a notification where the scanned TEV is faxed but an authorized individual is not presently logged into the system. This is indicated by notification text box 707.

FIG. 8 shows a screenshot 800 that prompts a user for a password of a team leader. Screenshot 800 includes a password field 802 that enables a user to enter an administrative team leader or other manager password.

Referring to FIG. 3, from TEV processing menu 304, the user may transition to a new TEVs screen 312. In example screenshot 500 in FIG. 5, the user may transition to the new TEV screen 312 by selecting buttons 506, 508 or 510 in FIG. 5.

Figure 9:
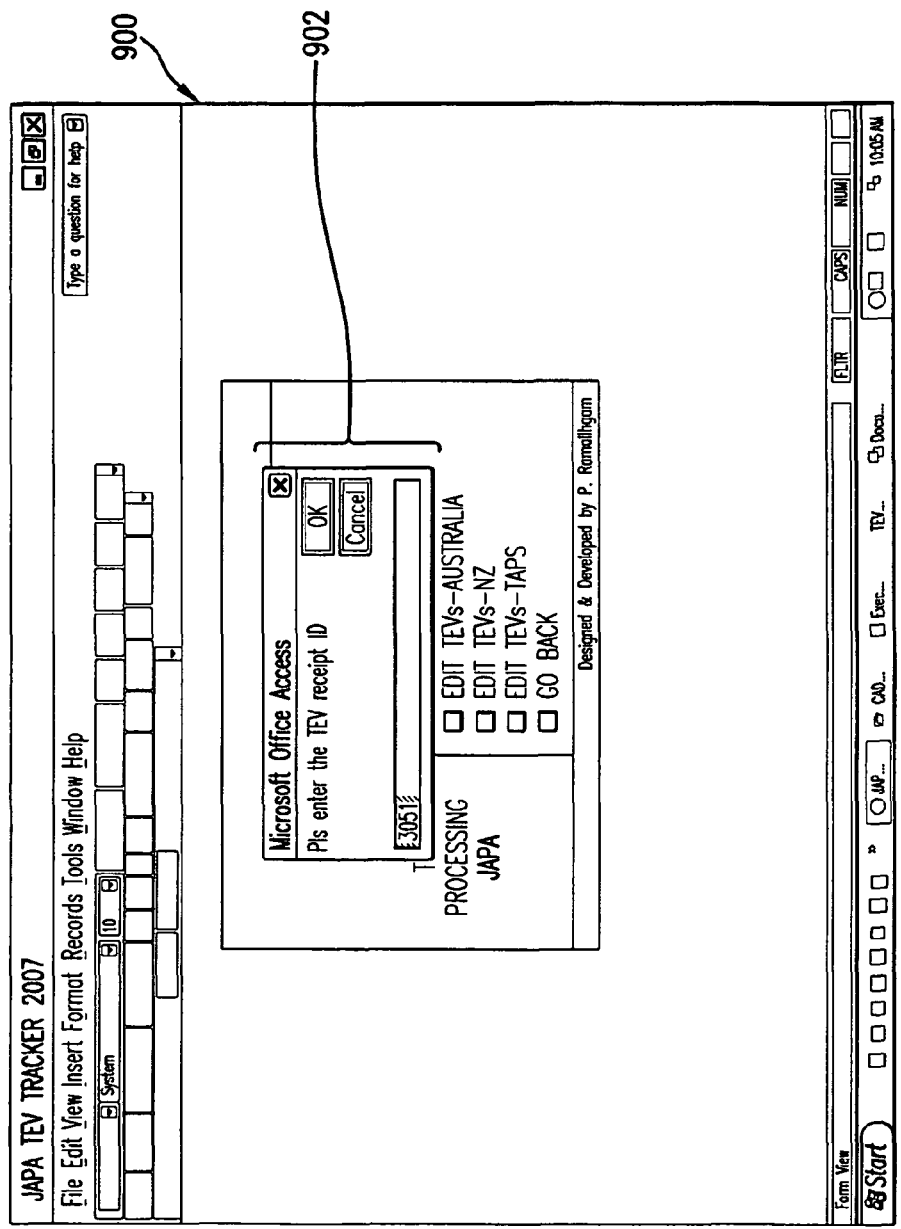

When a user selects buttons 506, 508, or 510, the user may be prompted by a dialog box as shown in FIG. 9. FIG. 9 shows screenshot 902. Screenshot 902 includes a dialog box 902 to transition to a new TEV form. Dialog box 902 prompts the user for a TEV receipt ID.

Figure 10:
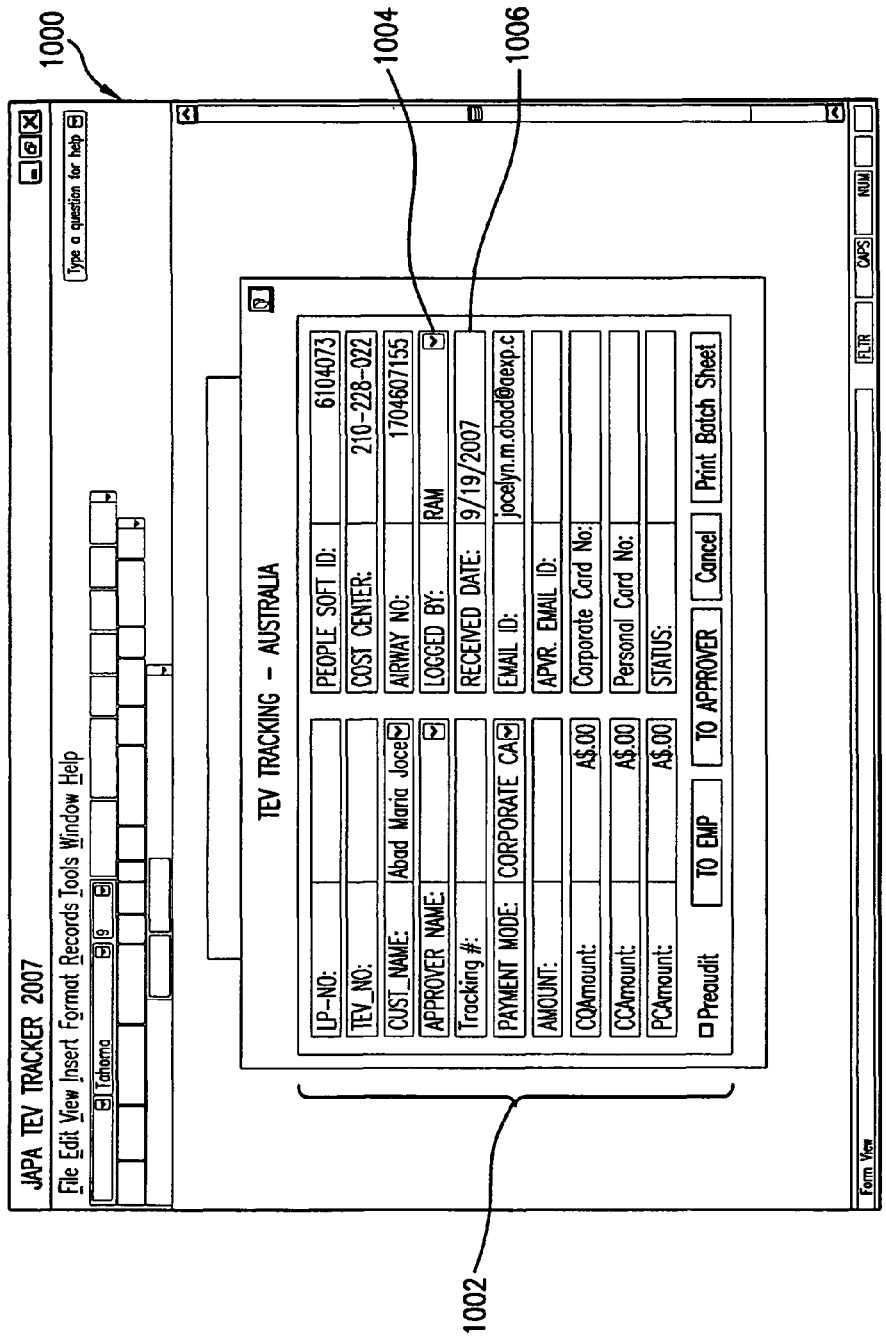

Once the user enters the TEV receipt ID and presses the OK button on dialog box 902, the user may transition to a form shown in screenshot 1000 in FIG. 10. Screenshot 1000 is a is an example of new TEV form 312 in FIG. 3. Screenshot 1000 includes a form 1002. Form 1002 enables a user to enter information about a TEV. The information may include information about the customer, such as a customer name, customer relationship management ID of the customer, an email address of the customer, or a card number of the customer. The information may also include information about the TEV, such as an approver name, tracking number, payment mode, an amount claimed by the TEV, cost center number to which the TEV is billed, or an airway bill identifier.

Some fields in form 1002 may be automatically completed. For example, a field 1004 may be automatically completed to identify the user entering data in form 1002. In another example, a field 1006 may be automatically completed to identify the receipt date of the TEV.

Once information is entered into this form an analysis is automatically done to determine whether the TEV comes under a pre-audit grid. The pre-audit grid includes a set of conditions that defines whether or not the TEV should be subject to an audit. For example, a pre-audit grid may look to the amount of the claim in the TEV. The greater the amount of the claim, the greater the chances of an audit. Also, the pre-audit grid may use a threshold. If the amount of the claim is greater than the threshold, an audit may be required.

Figure 11:
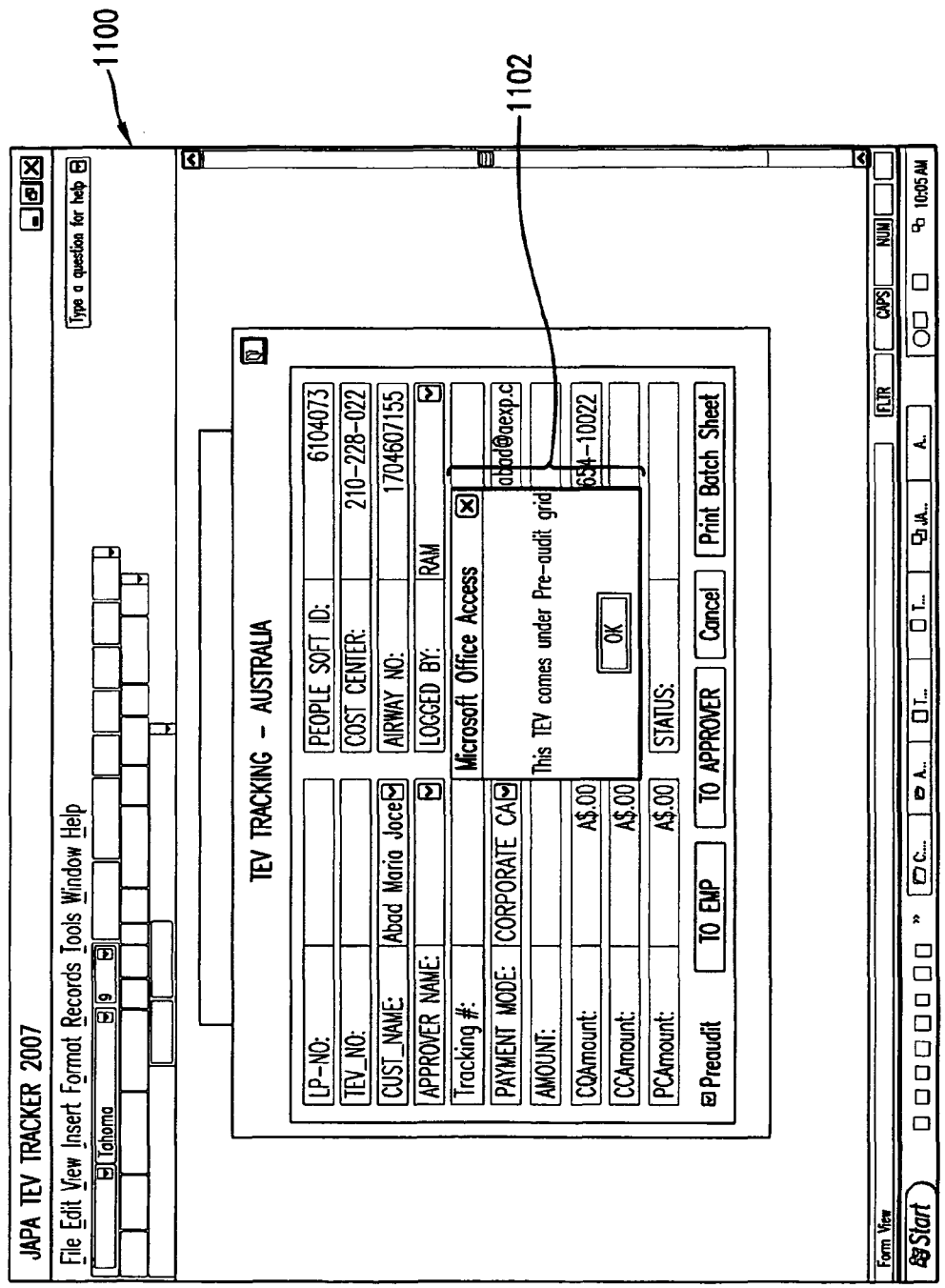

If the TEV comes under a pre-audit grid, then a dialog box, as shown in screenshot 1100 in FIG. 11, may be displayed. Screenshot 1100 includes a dialog box 1102.

Figure 12:
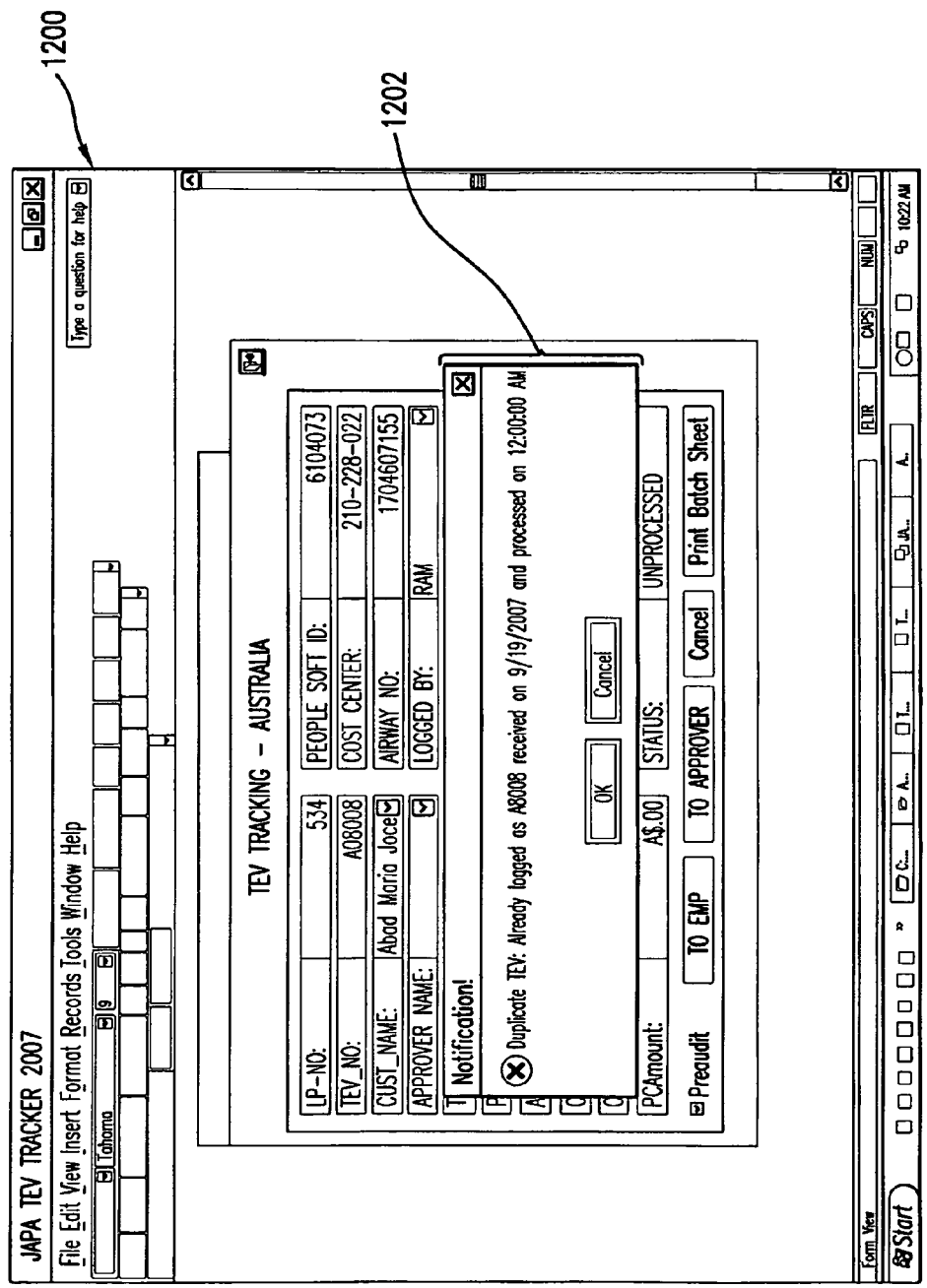

In addition to the pre-audit grid, other validation may be done on form 1002. An additional validation step is seen in FIG. 12. FIG. 12 includes screenshot 1200. Screenshot 1200 includes a notification dialog box 1202. Notification dialog box 1202 indicates that the TEV has already been logged. Notification dialog box 1202 shows the identifier of the TEV, the date it was received, and the time that it was processed.

Figure 13:
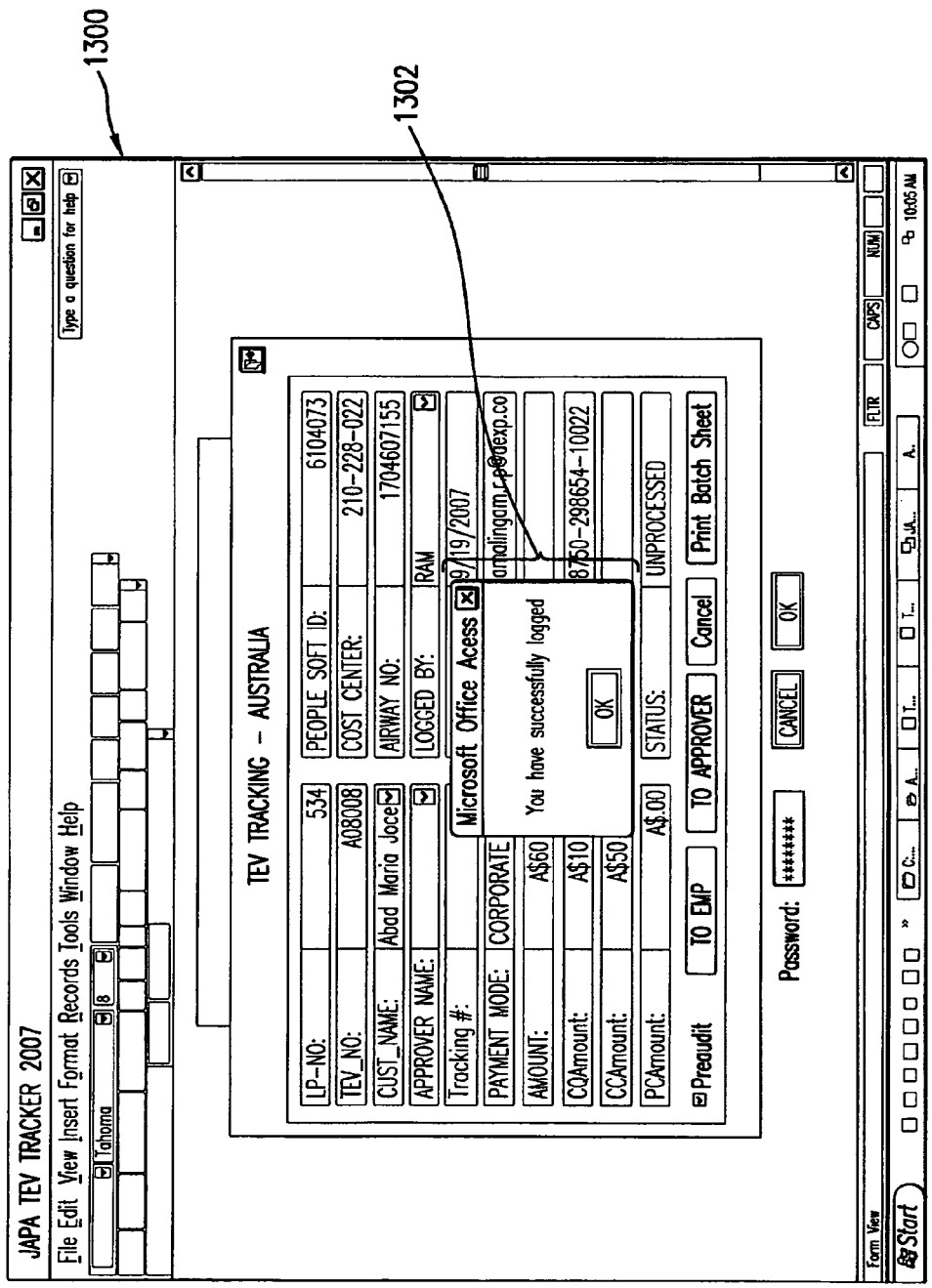

Once form 1002 has been subject to a pre-audit grid and other validation, then the TEV is recorded as shown as in FIG. 13. FIG. 13 includes screenshot 1300. Screenshot 1300 shows a dialog box 1302. Dialog box 1302 shows that the TEV has successfully been recorded.

Figure 14:
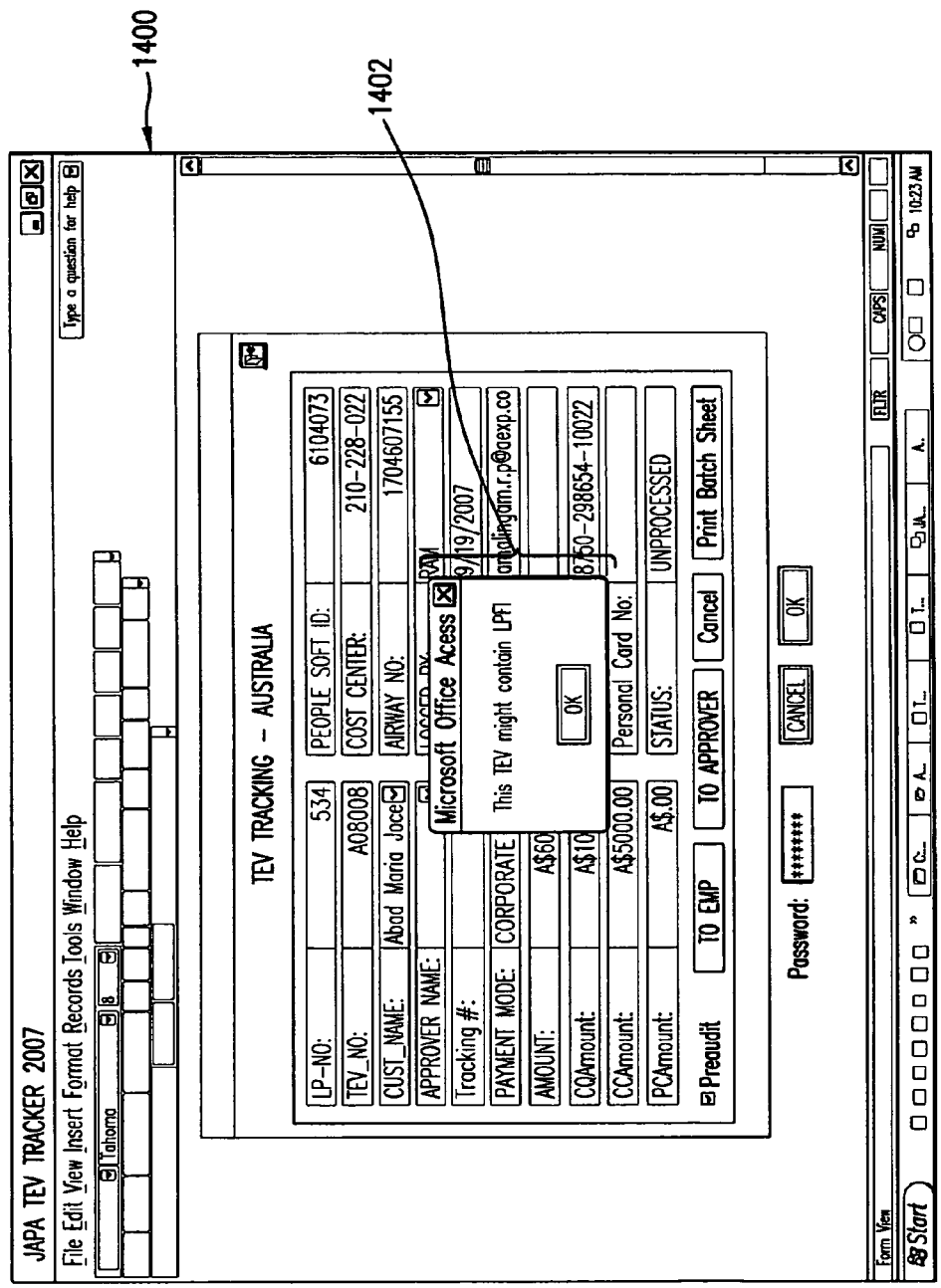

Once the TEV is recorded, TEV manager 102 determines whether the card member entered has been charged a late payment fee (LPF) in the previous month. If the user has been charged an LPF then a password may be required to enter the TEV. Further, a notification is required as shown in FIG. 14. FIG. 14 includes a screenshot 1400. Screenshot 1400 includes a notification dialog box 1402. Notification dialog box 1402 indicates that this TEV may contain an LPF. Further, the charging of a late payment fee may automatically subject the TEV to a pre-audit grid.

After the TEV is successfully recorded, a TEV number is generated. A number may also be generated to identify a batch of TEVs. In an example, a batch of TEVs may be a group of 15 TEVs.

Figure 15:
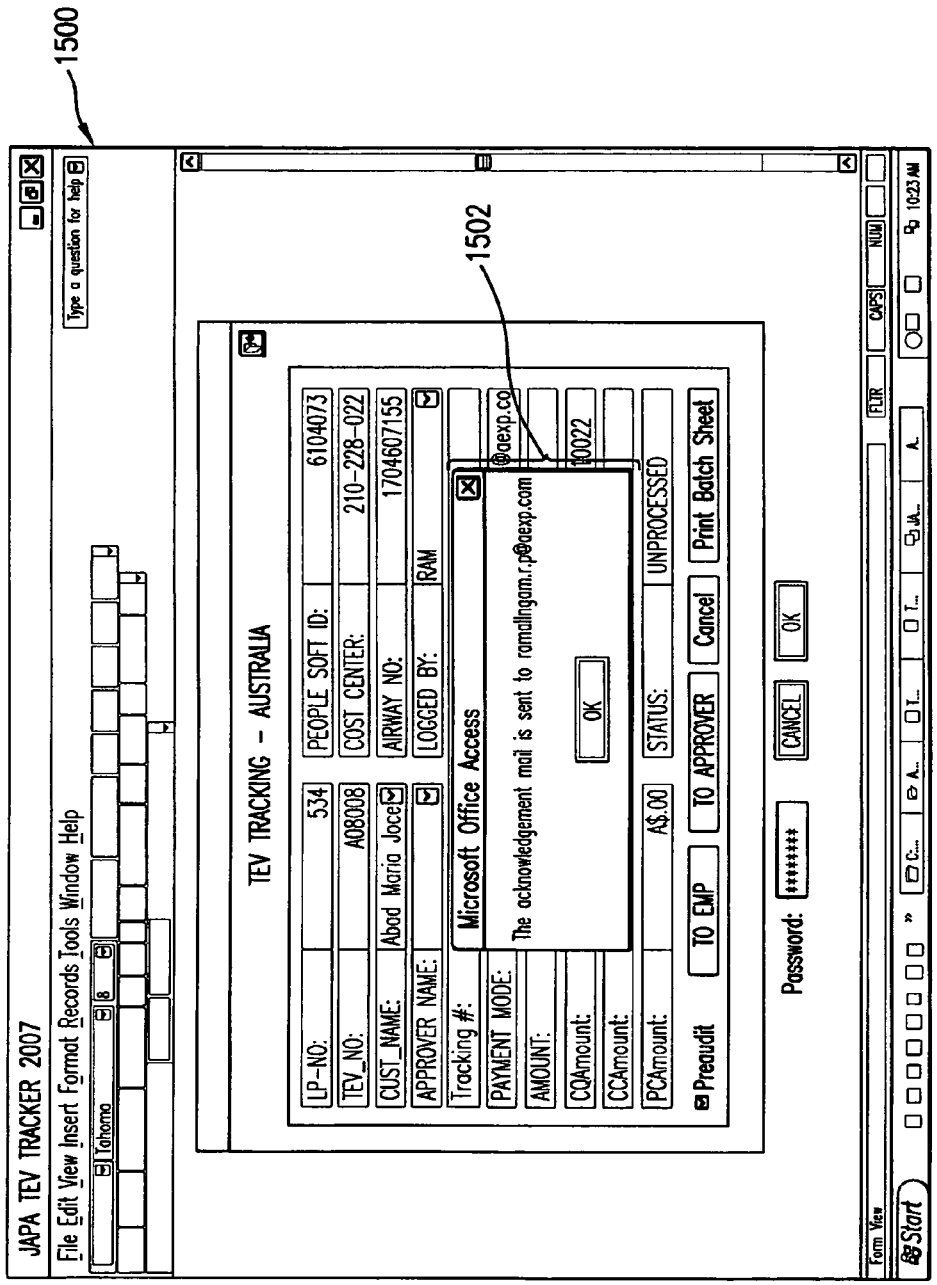

Once the TEV is recorded and the TEV number is generated, a notification to the user indicates that an acknowledgement has been sent to the customer. This is shown with respect to FIG. 15. FIG. 15 includes a screenshot 1500. Screenshot 1500 includes a notification dialog box 1502. Notification dialog box indicates that an email has been sent to the customer. In another example, the notification may be sent to the customer via a phone call, voicemail, instant message, SMS text message or other means. The notification may indicate to the customer that a TEV has been received.

Figure 16:
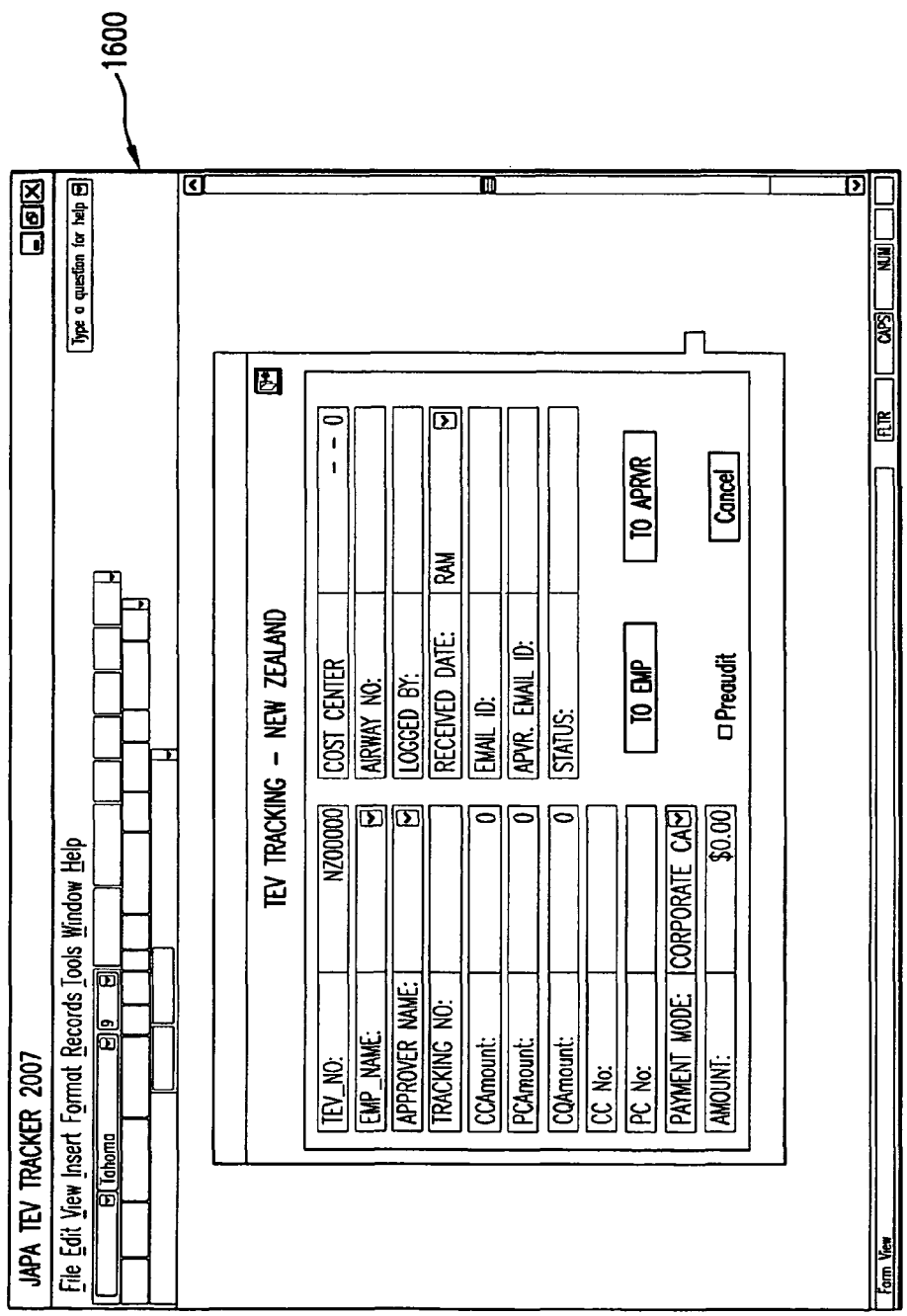

The form to enter a new TEV may vary according to market. Alternative examples of TEV forms are seen with FIGS. 16 and 17. FIG. 16 shows a screenshot 1600 including a form which is made to be used to enter a TEV from New Zealand. The form in screenshot 1600 may be accessible by selecting a button 506 in FIG. 5.

Figure 17:
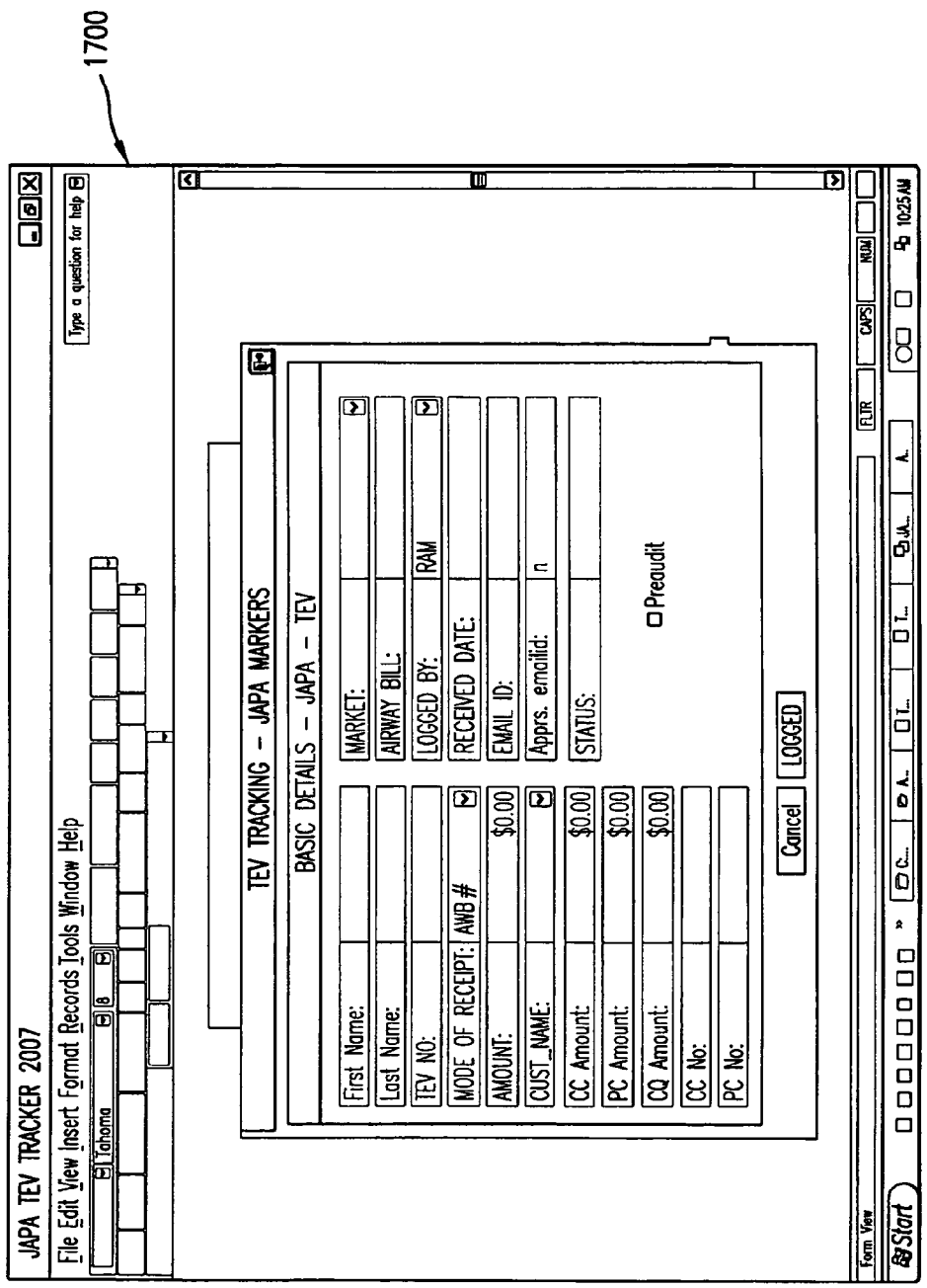

FIG. 17 shows a screenshot 1700 that includes a form which may be used to enter a TEV from other Japan, Asian, Pacific, or Australian markets. In an example, the form in screenshot 1700 may be accessible by selecting button 508 in FIG. 5.

Referring back to FIG. 3, from the TEV processing menu 304 a user may transition to an edit TEV screen 314. In the example shown in FIG. 5, edit TEV screen 314 may be accessible by selecting any of buttons 510, 512 or 514.

Figure 18:
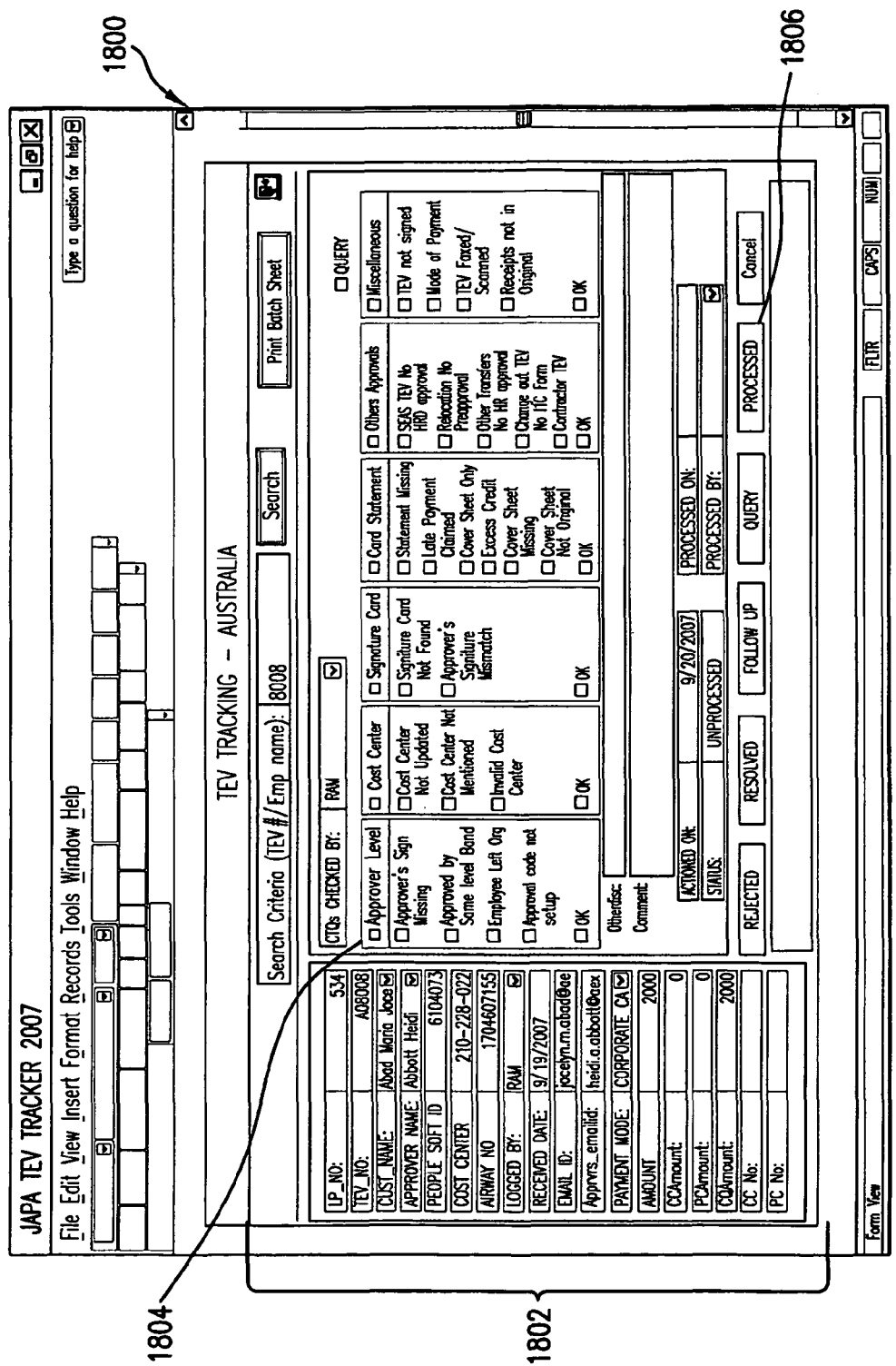

An example edit TEV screen 314 is shown in screenshot 1800 in FIG. 18. Screenshot 1800 includes a form 1802. Form 1802 enables a user to update a TEV record. Updating a TEV record may include indicating any noncompliance. Whenever an update is made on form 1802 a notification may be sent to the customer with processing details or of the noncompliance.

The TEV policy may require that every TEV be subject to certain checks prior to payment. A user may use screenshot 1800 to perform those TEV checks. For example, the TEV policy may require that every TEV be checked for an approval signature. An operator may use controls in a frame 1804 to check for the approval signature.

Once a TEV has been approved and payment has been allowed, an operator may mark the TEV as processed. To mark the TEV as processed, form 1802 may require the name of the processor and process date. Selecting button 1806 updates the TEV record. Selecting button 1806 may also result in a notification being sent to the customer indicating that a payment has been made. In this way, the customer is notified of the payment prior to seeing the payment credited to his/her transactional account.

Figure 19:
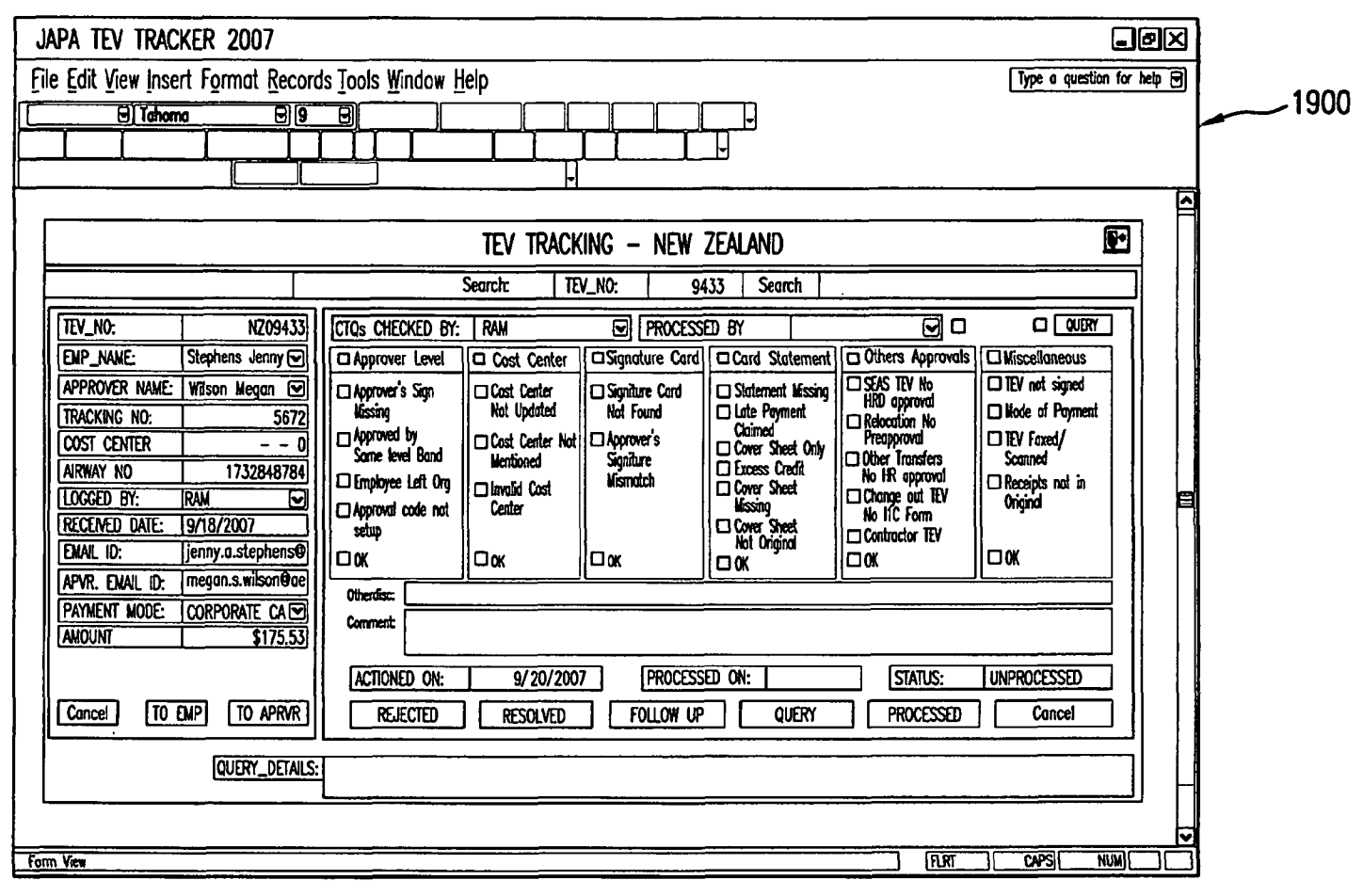

Different markets may have different edit forms according to the policy of that particular market. FIG. 19 shows a screenshot 1900 which displays an edit TEV form for the New Zealand market. In an example screenshot 1900 may be accessible by selecting button 512 in FIG. 5.

Figure 20:
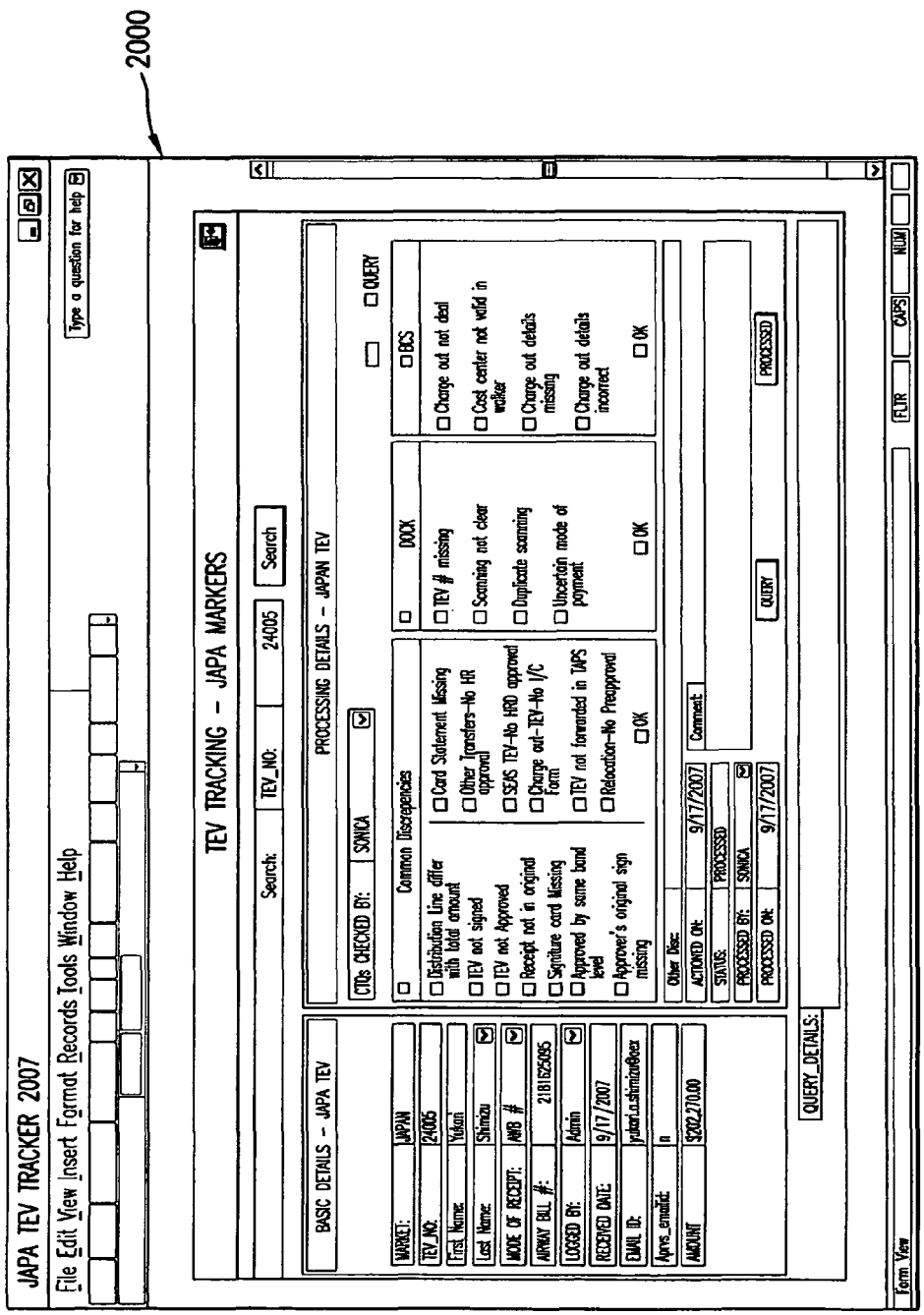

FIG. 20 shows a screenshot 2000 which shows a form for editing a TEV in other Japan, Asian, Pacific or Australian markets. The form in screenshot 2000 may be accessible by selecting button 514 in FIG. 5.

Referring to FIG. 3, from main menu 302 a user may transition to a post-audit screen 306. In an example, post-audit screen 306 may be accessible by selecting a button 404 in FIG. 4.

Figure 21:
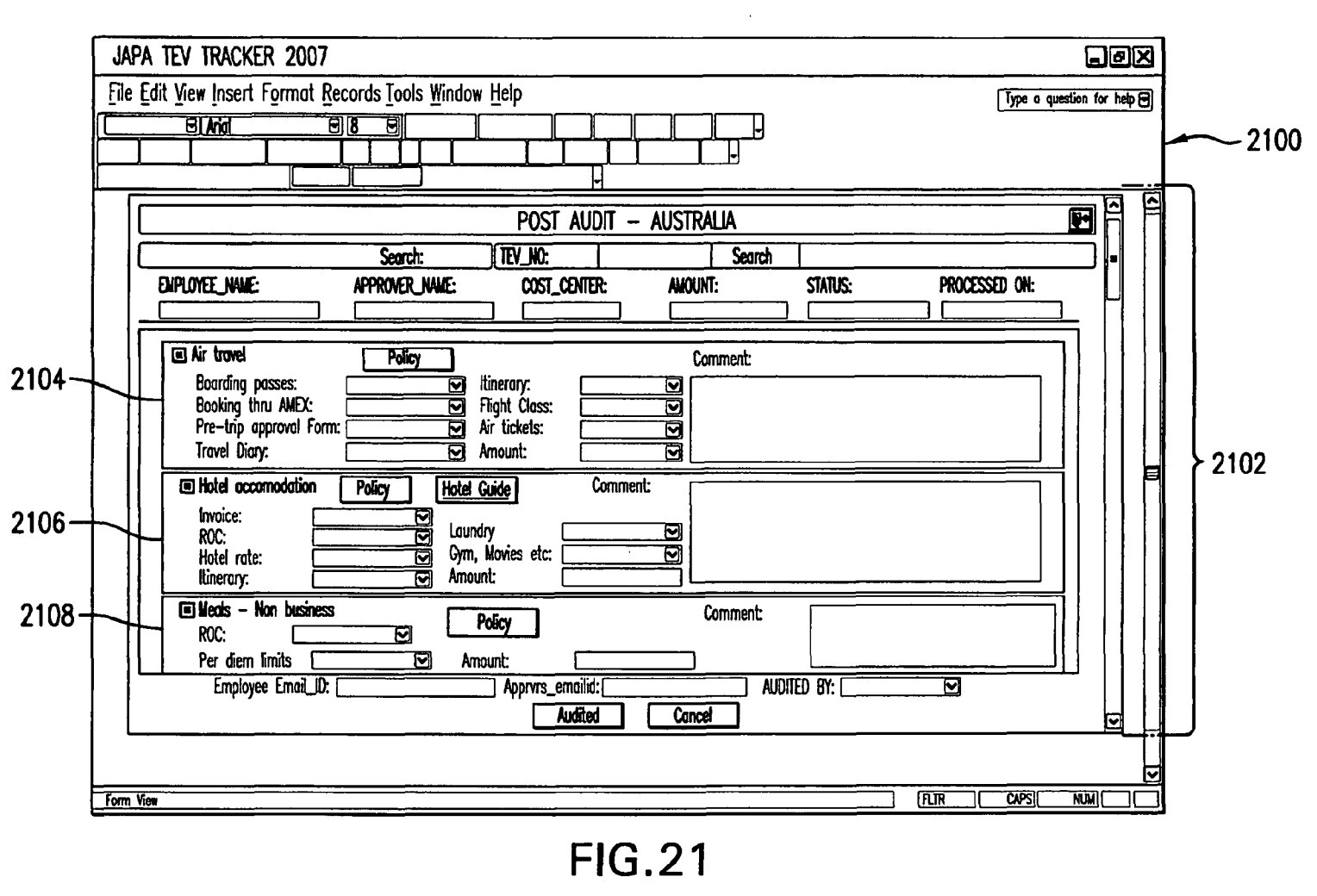

FIG. 21 shows a screenshot 2100. Screenshot 2100 is an example of post-audit screen 306. Screenshot 2100 includes a post-audit form 2102. Form 2102 includes a frame 2104, 2106, and 2108. Each frame may be used to enter different types of information. For example, frame 2104 may be used by a user to enter information about the air travel claimed in a TEV. A comment field may be used to explain why the air travel meets or does not meet the audit policies.

Frame 2106 may be used to enter information about the hotel accommodations claimed in the travel expense voucher. The information entered in this frame may include, for example, the invoice, the hotel rate, the itinerary, any laundry or other services used such as gyms, movie, etc. The total amount is entered and the policy button may be used to determine that the hotel accommodation satisfies the audit.

Frame 2108 may be used to enter audit information related to meals claimed in the travel expense voucher. Once the audit is conducted a notification may be sent to the employee to inform her of whether or not the audit has been satisfied.

Figure 22:
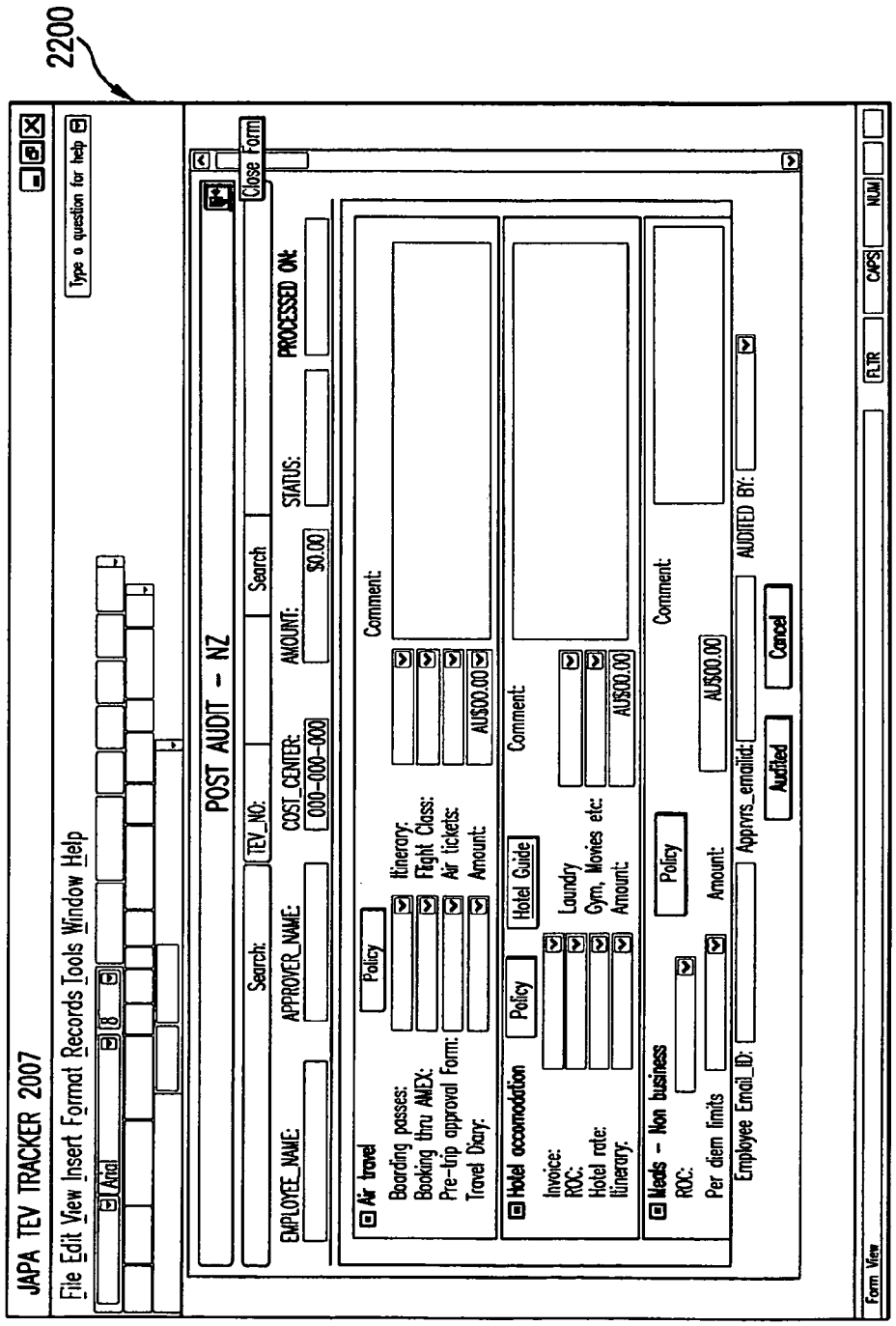

The audit forms may vary according to policy of the market. FIG. 22 shows a screenshot 2200 which shows an exemplary post-audit form for New Zealand.

Figure 23:
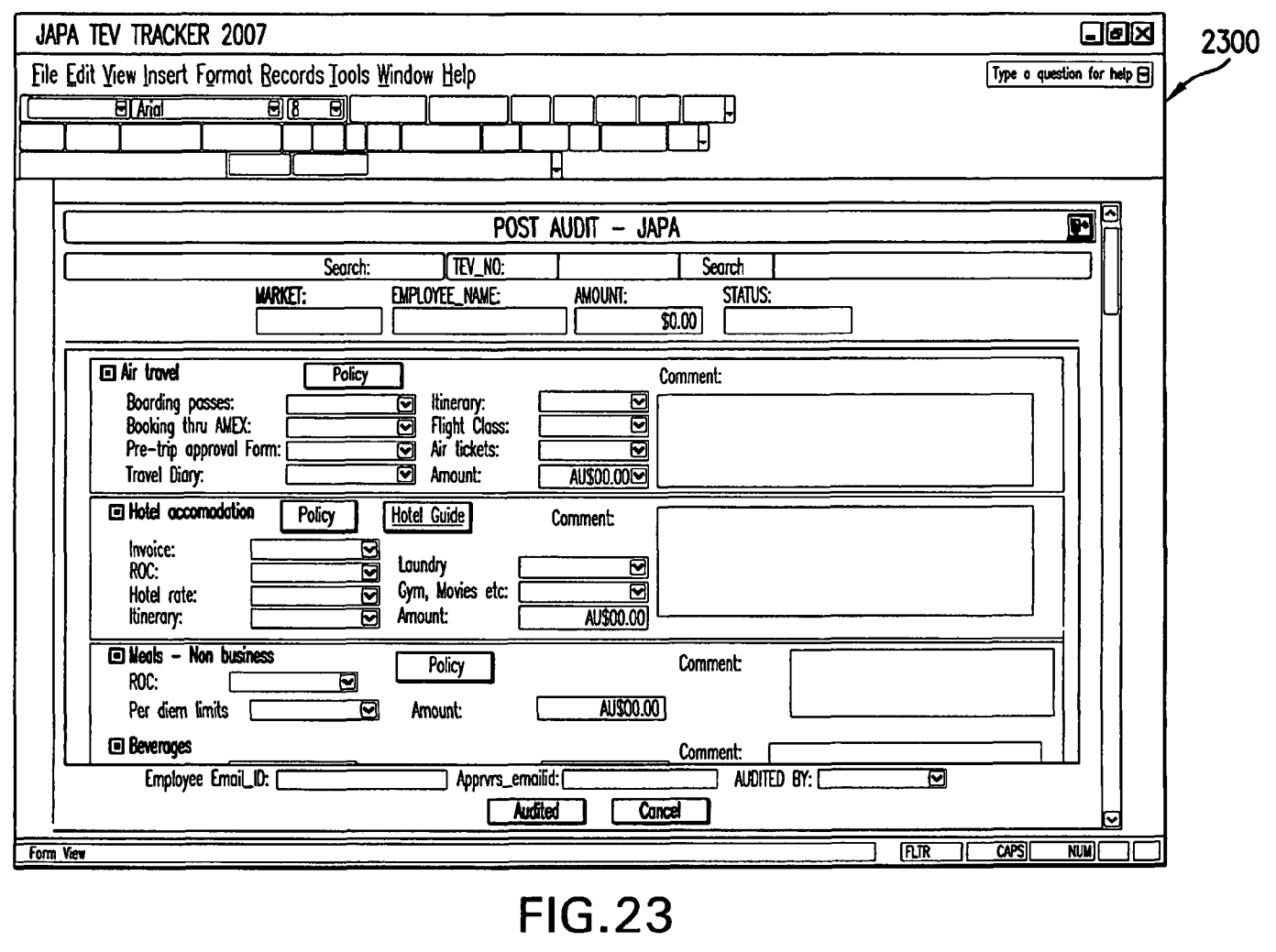

FIG. 23 includes a screenshot 2300 that shows an exemplary post-audit form for travel expense vouchers submitted from other Japan, Asian, Pacific and Australian markets.

Referring back to FIG. 3, a report 308 may be accessed from main menu 302. In an example in FIG. 4, reports may be accessed by selecting button 406 in screenshot 400.

FIG. 24 shows a screenshot 2400. A monthly report form may be retained as shown in screenshot 2400. The monthly form allows the user to identify audit observations over the course of any particular month. These audit observations may be generated based on previous data entered, or may be entered by a user based on his/her observations.

Figure 25:
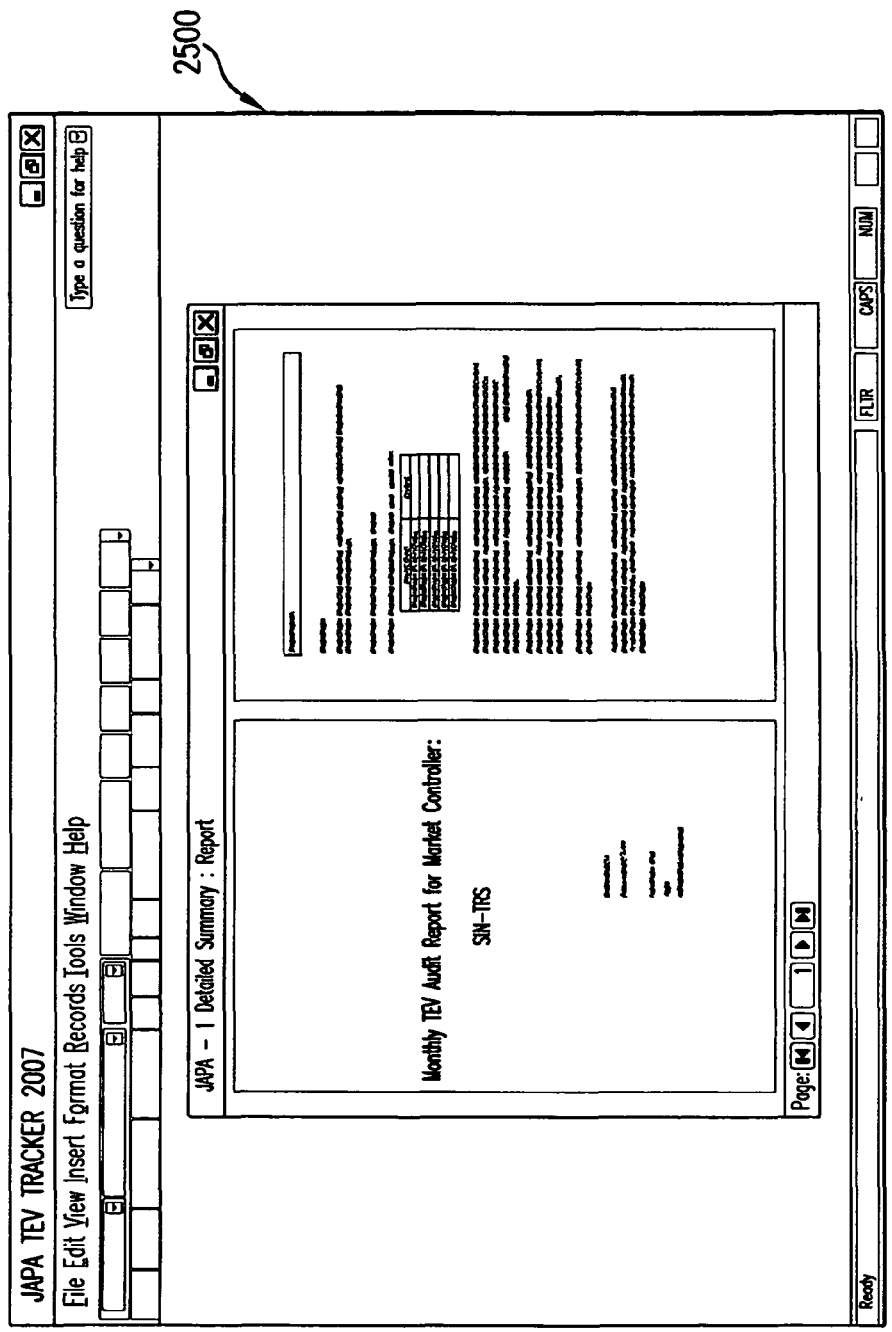

FIG. 25 includes a screenshot 2500. Screenshot 2500 shows a monthly report based on the audit observations. The monthly report may be used to evaluate the TEV policy or efficiency in TEV processing.

Figure 26:
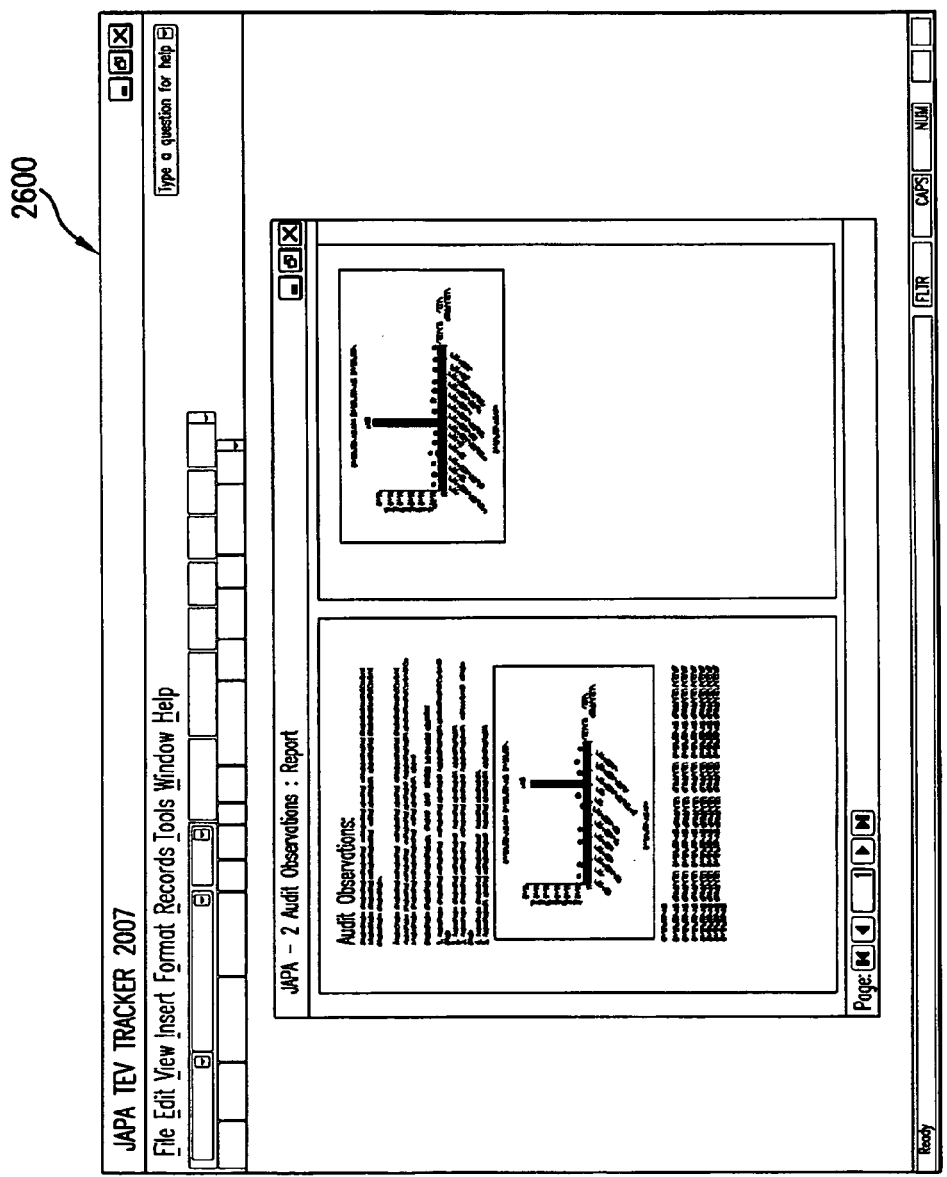

FIG. 26 shows a screenshot 2600 that shows a report based on audit observations over the course of the month. As with the report in screenshot 2500, the report in screenshot 2600 may be used to evaluate the TEV policy or efficiency in TEV processing.

Figure 27:
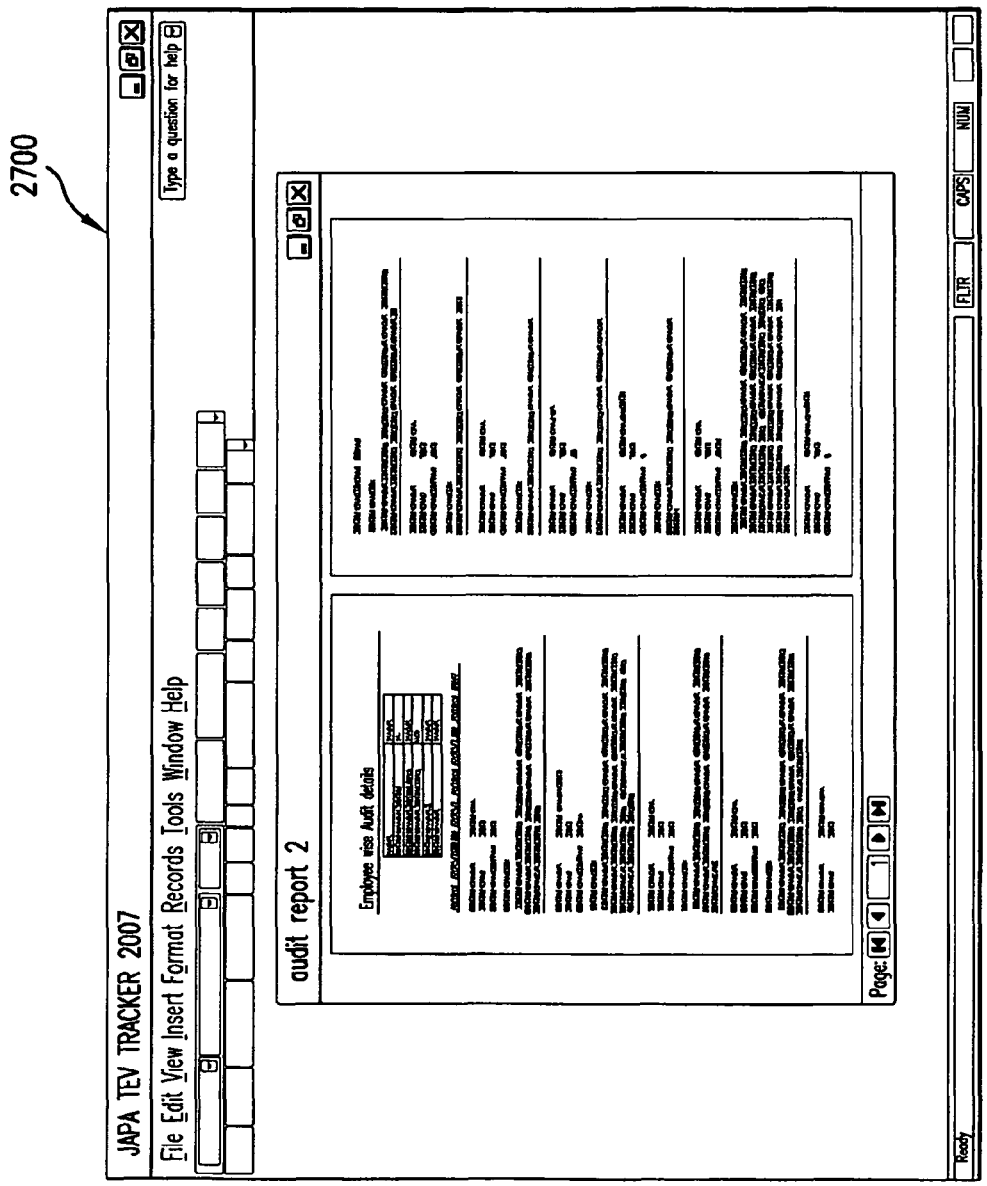

FIG. 27 shows a screenshot 2700 that shows a report showing audit details for a particular month for an individual employee. The report may be generated automatically based on information previously entered. The report may show all records of all the TEVs submitted by the user over the course of a month and the results of any audits performed on the TEVs conducted over the course of a month.

Figure 28:
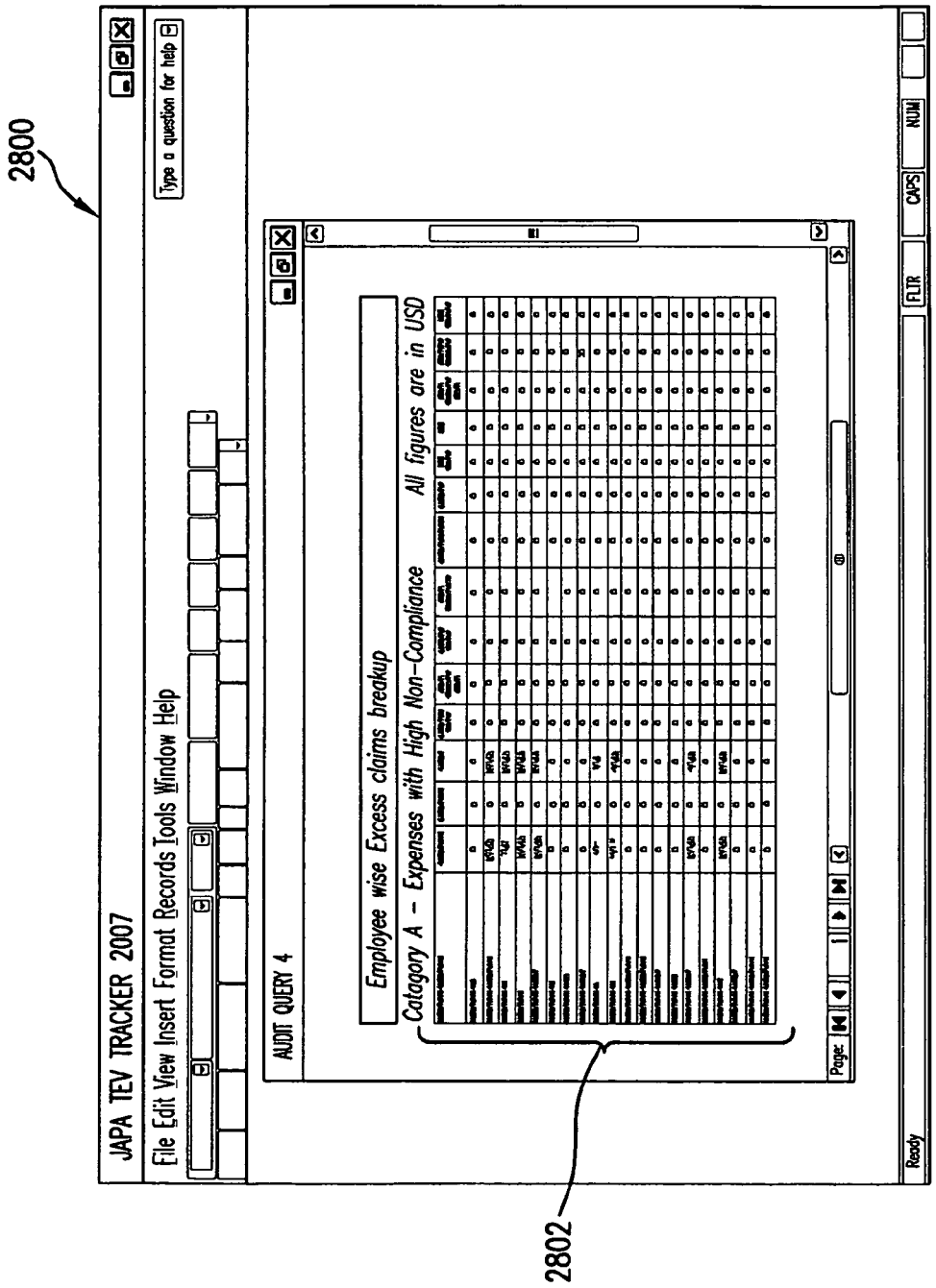

FIG. 28 shows a screenshot 2800 that shows a report showing the breakdown of TEVs by employee. The report may be generated in response to a query that specifies which employees to include in the report. Screenshot 2800 includes a spreadsheet 2802. Spreadsheet 2802 has employees listed in the rows and different expenses in the columns.

The reports in screenshots 2500, 2600, 2700, and 2800 may be exported into, for example, Microsoft Word or Adobe PDF format.

In one embodiment, the invention is directed toward one or more computer systems capable of carrying out the functionality described herein. An example of a computer system 2900 is shown in FIG. 29.

The computer system 2900 includes one or more processors, such as processor 2904. The processor 2904 is connected to a communication infrastructure 2906 (e.g., a communications bus, cross over bar, or network). Various software embodiments are described in terms of this exemplary computer system. After reading this description, it will become apparent to a person skilled in the relevant art(s) how to implement the invention using other computer systems and/or architectures.

Computer system 2900 can include a display interface 2902 that forwards graphics, text, and other data from the communication infrastructure 2906 (or from a frame buffer not shown) for display on the display unit 2930.

Computer system 2900 also includes a main memory 2908, preferably random access memory (RAM), and may also include a secondary memory 2910. The secondary memory 2910 may include, for example, a hard disk drive 2912 and/or a removable storage drive 2914, representing a floppy disk drive, a magnetic tape drive, an optical disk drive, etc. The removable storage drive 2914 reads from and/or writes to a removable storage unit 2918 in a well known manner. Removable storage unit 2918 represents a floppy disk, magnetic tape, optical disk, etc. which is read by and written to by removable storage drive 2914. As will be appreciated, the removable storage unit 2918 includes a computer usable storage medium having stored therein computer software and/or data.

In alternative embodiments, secondary memory 2910 may include other similar devices for allowing computer programs or other instructions to be loaded into computer system 2900. Such devices may include, for example, a removable storage unit 2918 and an interface 2920. Examples of such may include a program cartridge and cartridge interface (such as that found in video game devices), a removable memory chip (such as an erasable programmable read only memory (EPROM), or programmable read only memory (PROM)) and associated socket, and other removable storage units 2918 and interfaces 2920, which allow software and data to be transferred from the removable storage unit 2918 to computer system 2900.

Computer system 2900 may also include a communications interface 2924. Communications interface 2924 allows software and data to be transferred between computer system 2900 and external devices. Examples of communications interface 2924 may include a modem, a network interface (such as an Ethernet card), a communications port, a Personal Computer Memory Card International Association (PCM-CIA) slot and card, etc. Software and data transferred via communications interface 2924 are in the form of signals 2928 which may be electronic, electromagnetic, optical or other signals capable of being received by communications interface 2924. These signals 2928 are provided to communications interface 2924 via a communications path (e.g., channel) 2926. This channel 2926 carries signals 2928 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 2914, a hard disk installed in hard disk drive 2912, and signals 2928. These computer program products provide software to computer system 2900. The invention is directed to such computer program products.

Computer programs (also referred to as computer control logic) are stored in main memory 2908 and/or secondary memory 2910. Computer programs may also be received via communications interface 2924. Such computer programs, when executed, enable the computer system 2900 to perform the features of the present invention, as discussed herein. In particular, the computer programs, when executed, enable the processor 2904 to perform the features of the present invention. Accordingly, such computer programs represent controllers of the computer system 2900.

In an embodiment where the invention is implemented using software, the software may be stored in a computer program product and loaded into computer system 2900 using removable storage drive 2914, hard drive 2912 or communications interface 2924. The control logic (software), when executed by the processor 2904, causes the processor 2904 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

III. Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method comprising:
receiving, by a computer based system for processing reimbursement requests, a reimbursement request, wherein the reimbursement is based on a transaction account based reimbursement request transaction expense;
receiving, by the computer based system, indicia that a late fee has been assessed to the transaction account based on an unpaid reimbursement request transaction expense;
automatically performing, by the computer based system, an audit of the reimbursement request in response to receiving the indicia that the late fee has been assessed to the transaction account based on the unpaid reimbursement request transaction expense;
verifying, by the computer based system, that the reimbursement request conforms to a preset condition, wherein the preset condition comprises an amount of the transaction account based reimbursement request transaction expense exceeding a threshold; and
authorizing, by the computer based system, a reimbursement of the late fee in response to the audit finding that the reimbursement request conforms to the preset condition.

2. The method of claim 1, further comprising: notifying a customer that the reimbursement request has been received.

3. The method of claim 2, wherein the notifying comprises sending a communication to the customer indicating that the reimbursement request has been received.

4. The method of claim 1, wherein the performing the audit comprises providing an interface to verify compliance with a travel expense policy.

5. The method of claim 1, further comprising recording the reimbursement request and the result of the audit.

6. The method of claim 5, further comprising providing a report corresponding to the reimbursement request and the result of the audit.

7. The method of claim 1, wherein the transactional account is associated with a transaction instrument.

8. The method of claim 1, further comprising authorizing, by the computer based system, a reimbursement of the reimbursement request in response to a finding that the reimbursement request conforms to a preset condition.

9. A computer based system, comprising:
a computer network communicating with a memory;
the memory communicating with a processor for processing a reimbursement request; and the processor, when executing a computer program is configured to:
receive, by the processor a reimbursement request, wherein the reimbursement is based on a transaction account based reimbursement request transaction expense;
receive, by the processor, indicia that a late fee has been assessed to the transaction account based on an unpaid reimbursement request transaction expense;
automatically perform, by the processor, an audit of the reimbursement request in response to receiving indicia that the late fee has been assessed to the transaction account based on the unpaid reimbursement request transaction expense;
verify, by the processor, that the reimbursement request conforms to a preset condition, wherein the preset condition comprises an amount of the transaction account based reimbursement request transaction expense including a threshold; and
authorize, by the processor, a reimbursement of the late fee in response to the audit finding that the reimbursement request conforms to the preset condition.

10. The system of claim 9, further comprising a notification module that notifies a customer that the reimbursement request has been received.

11. The system of claim 10, wherein the notification module may send a communication to a customer indicating that the reimbursement request has been received.

12. The system of claim 9, wherein an interface is provided to verify compliance with a travel expense policy.

13. The system of claim 9, further comprising a tracking module that records the reimbursement request and a result of the audit.

14. The system of claim 13, further comprising a reporting module that provides a report corresponding to the reimbursement request and the result of the audit.

15. A non-transitory computer readable storage medium having stored thereon sequences of instruction, the sequences of instruction including instructions which, when executed by a computer based system for processing reimbursement requests, causes the computer based system to perform operations comprising:
receiving, by the computer based system, a reimbursement request, wherein the reimbursement is based on a transaction account based reimbursement request transaction expense;
receiving, by the computer based system, indicia that a late fee has been assessed to the transaction account based on an unpaid reimbursement request transaction expense;
automatically performing, by the computer based system, an audit of the reimbursement request in response to receiving indicia that the late fee has been assessed to the transaction account based on based on the unpaid reimbursement request transaction expense;
verifying, by the computer based system, that the reimbursement request conforms to a preset condition, wherein the preset condition comprises an amount of the transaction account based reimbursement request transaction expense exceeding a threshold; and
authorizing, by the computer based system, a reimbursement of the late fee in response to the audit finding that the reimbursement request conforms to the preset condition.

16. The medium of claim 15, further comprising notifying a customer that the reimbursement request has been received.

17. The medium of claim 16, wherein notifying comprises sending a communication to a customer indicating that the reimbursement request has been received.

18. The medium of claim 15, wherein an interface is provided to verify compliance with a travel expense policy.

19. The medium of claim 15, further comprising recording the reimbursement request and a result of the audit.

20. The medium of claim 19, further comprising providing a report corresponding to the reimbursement request and the result of the audit.

\* \* \* \* \*